United States Patent
Iwai et al.

(10) Patent No.: US 9,572,039 B2
(45) Date of Patent: Feb. 14, 2017

(54) MOBILE COMMUNICATION SYSTEM, CONTROL APPARATUS, COMMUNICATION CONTROL METHOD, AND NON-TRANSITORY COMPUTER READABLE MEDIUM

(71) Applicant: NEC Corporation, Tokyo (JP)

(72) Inventors: Takanori Iwai, Tokyo (JP); Hajime Zembutsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/431,327

(22) PCT Filed: May 28, 2013

(86) PCT No.: PCT/JP2013/003369
§ 371 (c)(1),
(2) Date: Mar. 26, 2015

(87) PCT Pub. No.: WO2014/049910
PCT Pub. Date: Apr. 3, 2014

(65) Prior Publication Data
US 2015/0264580 A1    Sep. 17, 2015

(30) Foreign Application Priority Data

Sep. 27, 2012  (JP) .................................. 2012-214050

(51) Int. Cl.
*H04W 16/14*   (2009.01)
*H04W 72/04*   (2009.01)
(Continued)

(52) U.S. Cl.
CPC ......... *H04W 16/14* (2013.01); *H04W 72/0406* (2013.01); *H04L 61/2007* (2013.01);
(Continued)

(58) Field of Classification Search
CPC .. H04W 16/14; H04W 72/0406; H04W 84/18; H04W 88/16; H04W 76/022; H04W 8/04; H04W 8/10; H04L 61/2007
(Continued)

(56) References Cited

U.S. PATENT DOCUMENTS 7,680,109 B2 * 3/2010 Lundin .................. H04L 12/189
370/348
8,891,501 B2 * 11/2014 Jin ....................... H04W 76/022
370/338

(Continued)

FOREIGN PATENT DOCUMENTS

| JP | A2005229447 A | * | 8/2005 |
| JP | 2011-217383 | * | 9/2012 |
| WO | WO 2010/090320 A1 | | 8/2010 |

OTHER PUBLICATIONS

Japanese Patent Application Publication English Translation of JPA2005229447A.*

(Continued)

*Primary Examiner* — Luat Phung
*Assistant Examiner* — Thomas R Cairns
(74) *Attorney, Agent, or Firm* — Finnegan, Henderson, Farabow, Garrett & Dunner LLP

(57) ABSTRACT

In one exemplary aspect, a core network (CN) (20) sets a shared CNB (30) shared for user packet transfer of a plurality of mobile terminals (1) connected to a base station (2) between a transfer node (4) and an external gateway (5). When an arbitrary one of the plurality of mobile terminals (1) performs communication, the CN (20) uses the shared CNB (20) and first RAB (40 and 50) for the arbitrary one of the plurality of mobile terminals. The CN (20) uses, when a first mobile terminal and a second mobile terminal of the plurality of mobile terminals (1) simultaneously perform communication, the shared CNB (30) and the first RAB (40
(Continued)

and 50) for the first mobile terminal and a second CNB (31) and second RAB (41 and 51) for the second mobile terminal, the second CNB (31) and the second RAB (41 and 51) being additionally set.

12 Claims, 28 Drawing Sheets

(51) Int. Cl.
*H04W 88/16* (2009.01)
*H04W 92/14* (2009.01)
*H04L 29/12* (2006.01)
*H04W 84/18* (2009.01)

(52) U.S. Cl.
CPC ............ *H04W 72/04* (2013.01); *H04W 84/18* (2013.01); *H04W 88/16* (2013.01); *H04W 92/14* (2013.01)

(58) Field of Classification Search
USPC ........................................................ 370/329
See application file for complete search history.

(56) References Cited

U.S. PATENT DOCUMENTS

| | | | |
|---|---|---|---|
| 2009/0052409 A1* | 2/2009 | Chen ................. | H04L 29/12009 370/338 |
| 2012/0033638 A1 | 2/2012 | Nishida et al. | |
| 2012/0083238 A1* | 4/2012 | Tiwari ................. | H04W 60/06 455/404.1 |
| 2014/0226646 A1* | 8/2014 | Nishigori ............ | H04W 76/022 370/338 |
| 2016/0183156 A1* | 6/2016 | Chin ................. | H04W 36/0022 370/331 |

OTHER PUBLICATIONS

3GPP TS 23.401, V9.13.0, $3^{rd}$ Generation Partnership Project; Technical Specification Group Services and System Aspects; General Packet Radio Service (GPRS) enhancements for Evolved Universal Terrestrial Radio Access (E-UTRA); (Release 9), Jun. 2012.

International Search Report mailed Jul. 16, 2013 in corresponding PCT International Application.

* cited by examiner (REFERENCE EXAMPLE) BEARER MANAGEMENT TABLE OF EXTERNAL GATEWAY

| TERMINAL GROUP IP ADDRESS | TRANSFER NODE IP ADDRESS | CNB IDENTIFIER |
|---|---|---|
| 2001:DB8:1::/60 | 10.0.0.1 | 00001 |
| 2001:DB8:2::/60 | 10.0.0.1 | 00002 |
| .... | .... | .... |

Fig. 2

(REFERENCE EXAMPLE) BEARER MANAGEMENT TABLE OF TRANSFER NODE

| EXTERNAL GATEWAY IP ADDRESS | CNB IDENTIFIER | BASE STATION IP ADDRESS | RAB IDENTIFIER |
|---|---|---|---|
| 10.1.0.1 | 00001 | 10.0.1.1 | 00001 |
| 10.1.0.1 | 00002 | 10.0.1.2 | 00001 |
| .... | .... | .... | .... |

Fig. 3

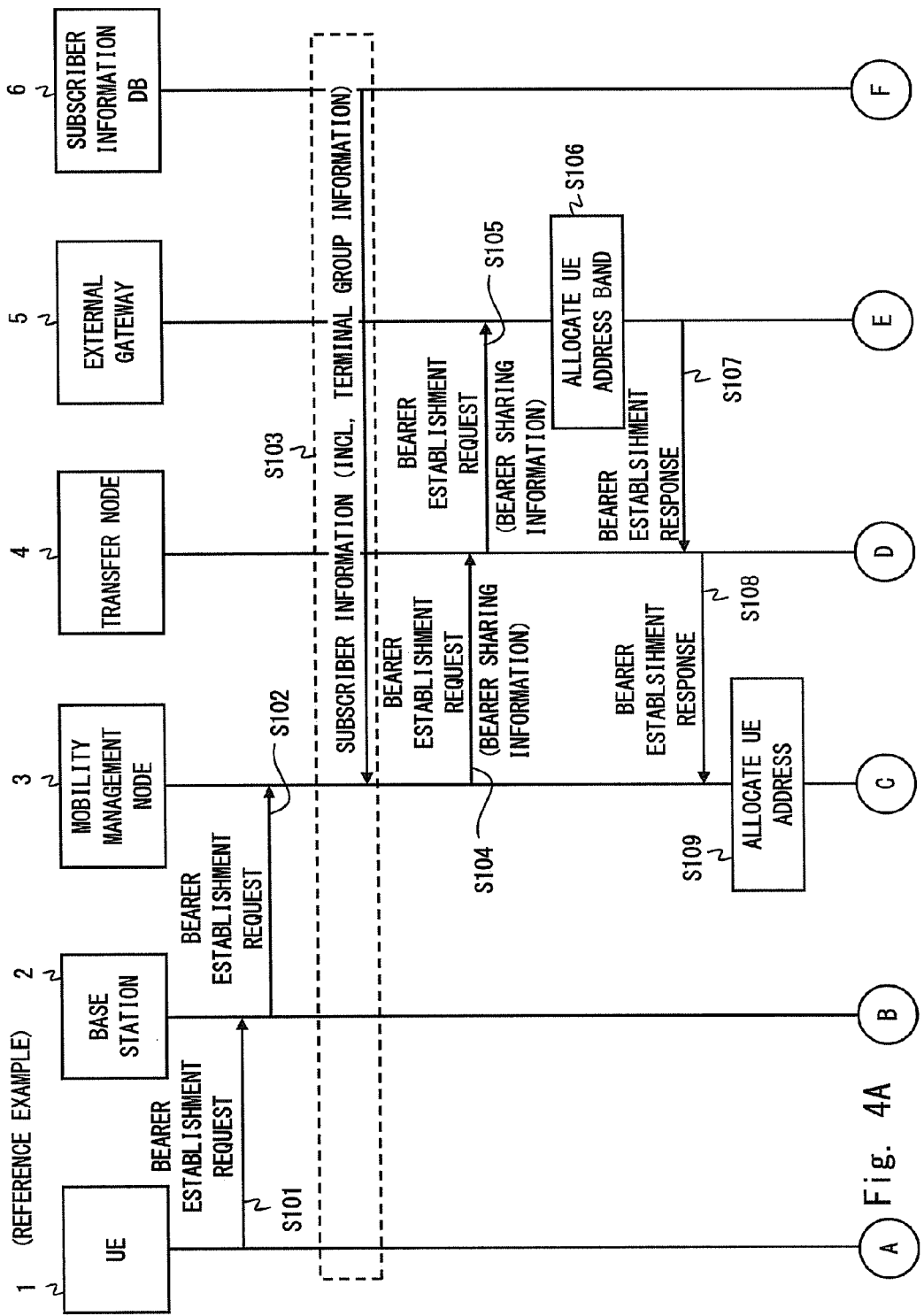

(IMPROVEMENT 1)  BEARER MANAGEMENT TABLE OF EXTERNAL GATEWAY

| TERMINAL (TERMINAL GROUP) IP ADDRESS | TRANSFER NODE IP ADDRESS | CNB IDENTIFIER |
|---|---|---|
| 2001:DB8:1::/60 | 10.0.0.1 | 00001 |
| 2001:DB8:2::/60 | 10.0.0.1 | 00002 |
| *2001:DB8:1:1::/64* | *10.0.0.1* | *00003* |
| .... | .... | .... |

Fig. 11

(IMPROVEMENT 1)  BEARER MANAGEMENT TABLE OF TRANSFER NODE

| EXTERNAL GATEWAY IP ADDRESS | CNB IDENTIFIER | BASE STATION IP ADDRESS | RAB IDENTIFIER |
|---|---|---|---|
| 10.1.0.1 | 00001 | 10.0.1.1 | 00001 |
| 10.1.0.1 | 00002 | 10.0.1.2 | 00001 |
| *10.1.0.1* | *00003* | *10.0.1.1* | *00002* |
| .... | .... | .... | .... |

Fig. 12

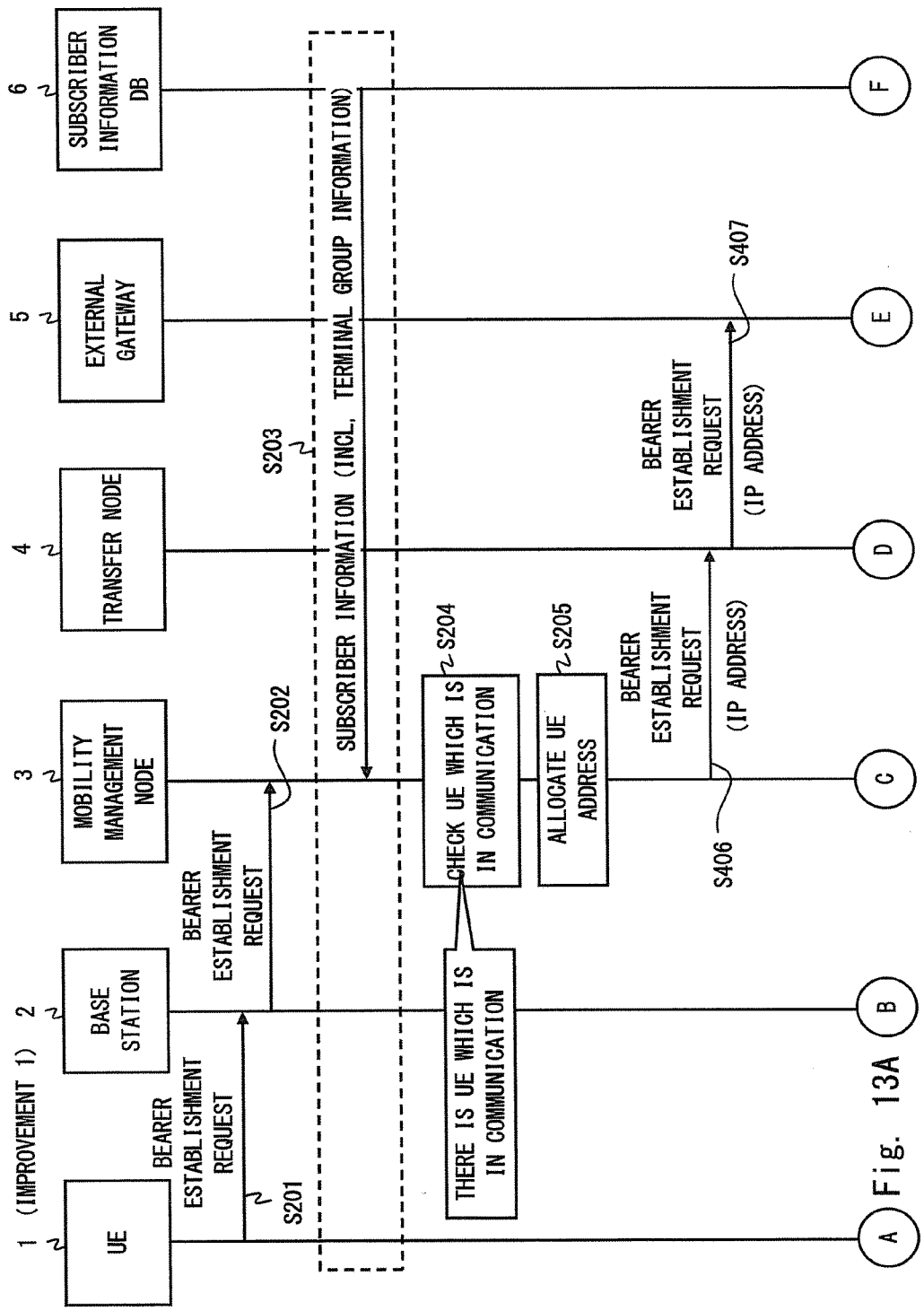

(IMPROVEMENT 2)  BEARER MANAGEMENT TABLE OF EXTERNAL GATEWAY

| TERMINAL GROUP IP ADDRESS | TRANSFER NODE IP ADDRESS | CNB IDENTIFIER |
|---|---|---|
| 2001:DB8:1::/60 | 10.0.0.1 | 00001 |
| 2001:DB8:2::/60 | 10.0.0.1 | 00002 |
| *2001:DB8:3::/60* | *10.0.0.1* | *00003* |
| .... | .... | .... |

Fig. 19

(IMPROVEMENT 2)  BEARER MANAGEMENT TABLE OF TRANSFER NODE

| EXTERNAL GATEWAY IP ADDRESS | CNB IDENTIFIER | BASE STATION IP ADDRESS | RAB IDENTIFIER |
|---|---|---|---|
| 10.1.0.1 | 00001 | 10.0.1.1 | 00001 |
| 10.1.0.1 | 00002 | 10.0.1.2 | 00001 |
| *10.1.0.1* | *00003* | *10.0.1.1* | *00002* |
| .... | .... | .... | .... |

Fig. 20

(IMPROVEMENT 3) BEARER MANAGEMENT TABLE OF EXTERNAL GATEWAY

| TERMINAL (TERMINAL GROUP) IP ADDRESS | TRANSFER NODE IP ADDRESS | CNB IDENTIFIER |
|---|---|---|
| 2001:DB8:1::/60 | 10.0.0.1 | 00001 |
| 2001:DB8:2::/60 | 10.0.0.1 | 00002 |
| .... | .... | .... |

Fig. 24

(IMPROVEMENT 3)   BEARER MANAGEMENT TABLE OF TRANSFER NODE

| TERMINAL (TERMINAL GROUP) IP ADDRESS | EXTERNAL GW IP ADDRESS | CNB IDENTIFIER | BASE STATION IP ADDRESS | RAB IDENTIFIER |
|---|---|---|---|---|
| 2001:DB8:1::/60 | 10.1.0.1 | 00001 | 10.0.1.1 | 00001 |
| 2001:DB8:2::/60 | 10.1.0.1 | 00002 | 10.0.1.2 | 00001 |
| *2001:DB8:1:1::/64* | *10.1.0.1* | *00001* | *10.0.1.1* | *00002* |
| .... | .... | .... | .... | .... |

Fig. 25

MOBILE COMMUNICATION SYSTEM, CONTROL APPARATUS, COMMUNICATION CONTROL METHOD, AND NON-TRANSITORY COMPUTER READABLE MEDIUM

CROSS-REFERENCE TO RELATED PATENT APPLICATIONS

This application is a National Stage Entry of International Application No. PCT/JP2013/003369, filed May 28, 2013, which claims priority from Japanese Patent Application No. 2012-214050, filed Sep. 27, 2012. The entire contents of the above-referenced applications are expressly incorporated herein by reference.

TECHNICAL FIELD

The present application relates to a mobile communication system, and for example, to communication control for transferring user packets.

BACKGROUND ART

A multiple access mobile communication system enables mobile terminals to perform radio communication substantially simultaneously, by sharing radio resources including at least one of time, frequency, and transmission power among the mobile terminals. Typical examples of multiple access schemes include a Time Division Multiple Access (TDMA), a Frequency Division Multiple Access (FDMA), a Code Division Multiple Access (CDMA), an Orthogonal Frequency Division Multiple Access (OFDMA), and any combination thereof. Unless otherwise stated, the term "mobile communication system" used in this specification means a multiple access mobile communication system.

A mobile communication system includes at least one mobile terminal and a network. The network includes a radio access network (RAN) and a core network (Mobile Core Network (CN)). The mobile terminal communicates with an external network (e.g., the Internet, packet data network, or Public Switched Telephone Networks (PSTN)) through the RAN and the CN. The mobile communication system is, for example, a Universal Mobile Telecommunications System (UMTS) or an Evolved Packet System (EPS) of the 3rd Generation Partnership Project (3GPP). The RAN is, for example, a Universal Terrestrial Radio Access Network (UTRAN) or an Evolved UTRAN (E-UTRAN). The CN is, for example, a General Packet Radio Service (GPRS) packet core or an Evolved Packet Core (EPC).

In the mobile communication system, in general, it is required to create a data bearer to transfer user packets between the external network and the mobile terminal per mobile terminal basis. This is because it is required to promptly switch and relocate a packet transfer route to provide mobile terminals with mobility. The data bearer is, for example, a UMTS bearer (General Packet Radio Service (GPRS) bearer), or an EPS bearer. The data bearer includes a radio access bearer (hereinafter referred to as a RAB) that is set in the RAN and a core network bearer (hereinafter referred to as a CNB) that is set in the CN.

The CNB is a tunnel that is set between a transfer node and an external gateway arranged in the CN, or a logical transmission path. The external gateway is a gateway node that is arranged in a boundary with the external network. The transfer node is a node that is arranged in a boundary with the RAN. The CNB is, for example, a CNB of the UMTS (i.e., GPRS Tunneling Protocol (GTP) tunnel), or an S5/S8 bearer of the EPS (i.e., GTP tunnel). Further, the external gateway is, for example, a Gateway GPRS Support Node (GGSN) or a Packet Data Network Gateway (P-GW). The transfer node is, for example, a user plane function of a Serving GPRS Support Node (SGSN) or a Serving Gateway (S-GW).

The RAB is a bearer between the mobile terminal and the transfer node of the CN. The RAB includes a radio bearer and a bearer between the RAN and the CN. The bearer between the RAN and the CN is set between a transfer node of the CN and a RAN node that performs a Radio Link Control (RLC) and a Radio Resource Control (RRC). The radio bearer is set between the mobile terminal and the RAN node described above in the RAN. The RAN node that performs the RLC and the RRC is, for example, a Radio Network Controller (RNC) of the UMTS or a base station (evolved NodeB (eNB)) of the EPS. The bearer set between the RAN and the CN is, for example, an Iu bearer (i.e., GTP tunnel) of the UMTS or an S1 bearer (i.e., GTP tunnel) of the EPS. The radio bearer is, for example, a Uu bearer of the UMTS or an LTE-Uu bearer of the EPS.

In summary, the CN need to create the CNB for each mobile terminal. The transfer node needs to store and manage a tunnel configuration regarding the CNB including a tunnel identifier (tunnel endpoint identifier) and an address of the external gateway (e.g., Internet Protocol (IP) address). The external gateway allocates a mobile terminal that attaches to the CN an address (e.g., IP address) to communicate with an external network, and performs, for the CNB, tunnel set up, charging control, and Quality of Service (QoS) control and the like.

For example, Non-patent literature 1 discloses procedures for establishing and recovering a data bearer (i.e., EPS bearer) to transfer user packets of a mobile terminal in response to an attach of the mobile terminal to a CN, a service request or the like in the EPS.

CITATION LIST

Non Patent Literature

[Non-Patent Literature 1] 3GPP TS 23.401 V9.13.0, "General Packet Radio Service (GPRS) enhancements for Evolved Universal Terrestrial Radio Access Network (E-UTRAN) access", June 2012

SUMMARY OF INVENTION

Technical Problem

As described above, the CN need to create the CNB for each mobile terminal and manage the CNBs. In order to address with an increase in the number of CNBs, for example, the external gateway and the transfer node need to have capabilities to cope with an increase in the processes such as tunnel set-up/management and IP address allocation. Specifically, it is required to enhance the performance of the transfer node or to additionally provide a transfer node. In order to deal with this problem, the present inventors have suggested, in the previous Japanese Patent Application No. 2011-217383, architecture and methods capable of sharing one CNB for transferring user packets of a plurality of mobile terminals.

The present application provides improvements of the architecture and the methods suggested in the previous Patent Application (Japanese Patent Application No. 2011-

217383). Specifically, one exemplary object of the present invention is to suppress the occurrence of call loss in architecture where one CNB is shared among a plurality of mobile terminals for transferring user packets thereof. Another exemplary object of the present invention is to perform efficient terminal grouping in architecture where one CNB is shared among a plurality of mobile terminals for transferring user packets thereof. The technical ideas obtained by the present inventors to address these problems will be apparent from the description of the exemplary embodiments stated below and the drawings.

Solution to Problem

According to one exemplary aspect, a mobile communication system includes: a radio access network including a base station; and a core network including an external gateway and a transfer node. The core network creates a shared core network bearer (CNB) between the transfer node and the external gateway, the shared CNB which is shared for transferring user packets of a plurality of mobile terminals connected to the base station. The core network provides a one-to-one mapping between the shared CNB and a first radio access bearer (RAB) in the transfer node. When an arbitrary one of the plurality of mobile terminals performs communication, the core network uses the shared CNB and the first RAB for the arbitrary one of the plurality of mobile terminals. Further, when a first mobile terminal and a second mobile terminal of the plurality of mobile terminals simultaneously perform communication, the core network uses the shared CNB and the first RAB for the first mobile terminal and additionally creates and uses a second CNB and a second RAB for the second mobile terminal.

According to one exemplary aspect, a mobile communication system includes: a radio access network including a base station; and a core network including an external gateway and a transfer node. The core network creates first and second shared core network bearers (CNBs) between the transfer node and the external gateway, the first and second CNBs which are shared for transferring user packets of a plurality of mobile terminals connected to the base station. The core network provides a one-to-one mapping between each of the first CNB and the second CNB and a radio access bearer (RAB). Further, when arbitrary two of the plurality of mobile terminals perform communication, the core network uses the first shared CNB for one of the arbitrary two of the plurality of mobile terminals and also uses the second shared CNB for the other one of the arbitrary two of the plurality of mobile terminals.

According to one exemplary aspect, a mobile communication system includes: a radio access network including a base station; and a core network including an external gateway and a transfer node. The core network creates a shared core network bearer (CNB) between the transfer node and the external gateway, the shared CNB which is shared for transferring user packets of a plurality of mobile terminals connected to the base station. The core network provides a mapping between the shared CNB and a first radio access bearer (RAB). When an arbitrary first mobile terminal of the plurality of mobile terminals performs communication, the core network uses the shared CNB and the first RAB for the first mobile terminal. Further, in response to receiving a communication request from an arbitrary second mobile terminal of the plurality of mobile terminals while the first mobile terminal performs communication, the core network creates a second RAB, provides a mapping between the second RAB and the shared CNB, and uses the shared CNB and the second RAB for the second mobile terminal.

According to one exemplary aspect, a mobile communication system includes: a radio access network including a base station; and a core network including an external gateway and a transfer node. The core network creates a shared core network bearer (CNB) between the transfer node and the external gateway, the shared CNB which is shared for transferring user packets of a plurality of mobile terminals connected to the base station. The core network provides a one-to-one mapping between the shared CNB and a first radio access bearer (RAB) in the transfer node. When an arbitrary one of the plurality of mobile terminals performs communication, the core network uses the shared CNB and the first RAB for the arbitrary one of the plurality of mobile terminals. Further, when the arbitrary one of the plurality of mobile terminals ends communication and transitions from a CONNECTED state to an IDLE state, the core network sends a notification to temporarily suppress the next communication to the arbitrary one of the plurality of mobile terminals.

According to one exemplary aspect, a mobile communication system includes: a radio access network including a base station; and a core network including an external gateway and a transfer node. The core network determines, based on communication characteristics of a plurality of mobile terminals connected to the base station, at least one mobile terminal to be included in a terminal group. The core network creates a shared core network bearer (CNB) between the transfer node and the external gateway, the shared CNB which is shared for transferring user packets of the terminal group. The core network provides a one-to-one mapping between the shared CNB and a first radio access bearer (RAB) in the transfer node. Further, when an arbitrary one of mobile terminals included in the terminal group performs communication, the core network uses the shared CNB and the first RAB for the arbitrary one of the mobile terminals.

Advantageous Effects of Invention

According to the exemplary aspects stated above, it is for example possible to suppress the occurrence of call loss in architecture where one CNB is shared among a plurality of mobile terminals for transferring user packets thereof. Further, according to the exemplary aspects stated above, it is possible to perform efficient terminal grouping in the architecture that where one CNB is shared among a plurality of mobile terminals for transferring user packets thereof.

BRIEF DESCRIPTION OF DRAWINGS

FIG. 2 is a diagram showing one example of a bearer management table of an external gateway according to an exemplary embodiment (reference example);

FIG. 3 is a diagram showing one example of a bearer management table of a transfer node according to an exemplary embodiment (reference example);

FIG. 4A is a sequence diagram showing one example of a bearer establishment procedure according to an exemplary embodiment (reference example);

FIG. 11 is a diagram showing one example of a bearer management table of an external gateway according to an exemplary embodiment (improvement 1);

FIG. 12 is a diagram showing one example of a bearer management table of a transfer node according to an exemplary embodiment (improvement 1);

FIG. 13A is a sequence diagram showing one example of a bearer establishment procedure according to an exemplary embodiment (improvement 1);

FIG. 19 is a diagram showing one example of a bearer management table of a transfer node according to an exemplary embodiment (improvement 2);

FIG. 20 is a diagram showing one example of the bearer management table of the transfer node according to an exemplary embodiment (improvement 2);

FIG. 24 is a diagram showing one example of a bearer management table of an external gateway according to an exemplary embodiment (improvement 3);

FIG. 25 is a diagram showing one example of a bearer management table of a transfer node according to an exemplary embodiment (improvement 3);

DESCRIPTION OF EMBODIMENTS

Hereinafter, with reference to the drawings, specific exemplary embodiments will be described in detail. Throughout the drawings, the same or corresponding components are denoted by the same reference symbols, and overlapping descriptions will be omitted as appropriate for the sake of clarity of description.

First Exemplary Embodiment

Figure 1:
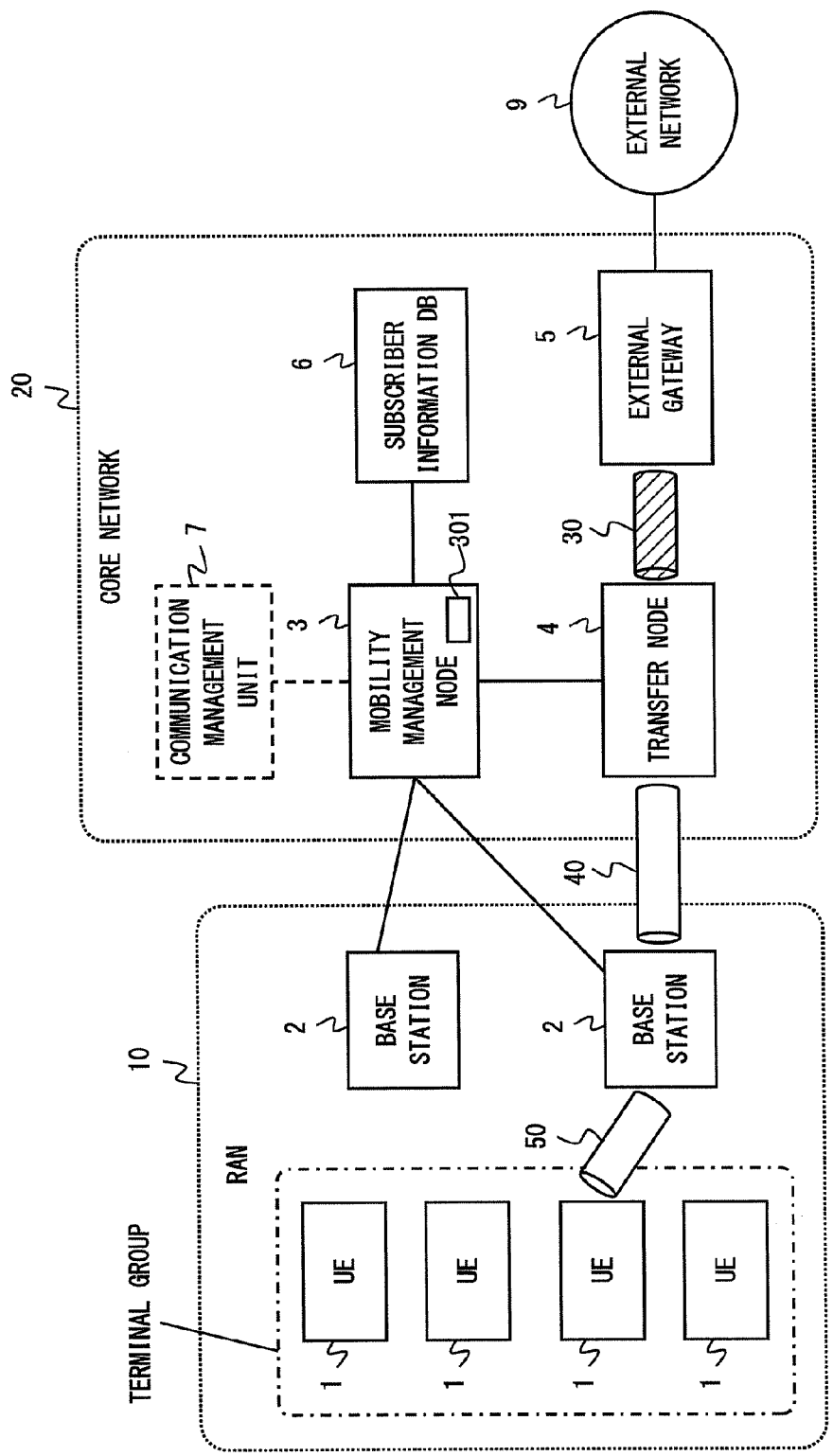
FIG. 1 is a block diagram showing a configuration example of a mobile communication system according to an exemplary embodiment.

FIG. 1 shows a configuration example of a mobile communication system according to several exemplary embodiments including the first exemplary embodiment. The mobile communication system includes a RAN 10 and an MCN 20. The RAN 10 includes a base station 2. The base station 2 is connected to a mobile terminal (UE) 1 by a radio access technology. The mobile terminal 1 has a radio interface, is connected to the base station 2 by the radio access technology, and is connected to the MCN 20 through the RAN 10. The mobile terminal 1 communicates with an external network 9 through the RAN 10 and the CN 20. The external network 9 is the Internet, a packet data network, a PSTN, or a combination thereof. The RAN 10 is, for example, a UTRAN or an E-UTRAN, or a combination thereof. In the UTRAN, the base station 2 corresponds to a Node B and an RNC. In the E-UTRAN, the base station 2 corresponds to an eNB.

The base station 2 establishes a radio bearer 50 with the mobile terminal 1 and also establishes a bearer 40 with a transfer node 4, for transferring user packets of the mobile terminal 1. In the UTRAN, the bearer 40 corresponds to an Iu bearer. In the E-UTRAN, the bearer 40 corresponds to an S1 bearer. The combination of the bearer 40 and the radio bearer 50 is referred to as a radio access bearer (RAB).

The CN 20 is a network mainly managed by an operator that provides mobile communication services. The CN 20 includes a Packet Switched (PS) core. The CN 20 is, for example, an EPC, a GPRS packet core, or a combination thereof. In the example shown in FIG. 1, the CN 20 includes a mobility management node 3, a transfer node 4, an external gateway 5, and a subscriber information database 6. The CN 20 may further include a communication management unit 7.

The mobility management node 3 is a control plane node, and performs mobility management (e.g., location registration), bearer management (e.g., bearer establishment, bearer modification, bearer release) and the like of the mobile terminal 1. A controller 301 controls the core network 20 and the base station 2 at least for the bearer management. In the case of the UMTS, for example, the mobility management node 3 includes control plane functions of an SGSN. In the case of the EPS, the mobility management node 3 includes an MME. The mobility management node 3 sends and receives control messages (e.g., S1AP messages) to and from the base station 2, and sends and receives Non-Access Stratum (NAS) messages to and from the mobile terminal 1. The NAS messages are not terminated in the RAN 10, and are transparently transmitted between the mobile terminal 1 and the CN 20 without depending on the radio access technology of the RAN 10. The NAS messages transmitted from the mobile terminal 1 to the CN 20 include NAS request messages such as an attach request, a bearer establishment request, a bearer recovery request, and a location update request. In the case of the EPS, for example, the NAS request messages from the mobile terminal 1 include an Attach Request, a Service Request, a PDN connectivity request, a Bearer Resource Allocation Request, a Bearer Resource Modification Request, a Tracking Area Update (TAU) Request, and a Routing Area Update (RAU) Request.

The transfer node 4 transfers user packets of the mobile terminal 1 between the RAN 10 (specifically, the base station 2) and the external gateway 5. The transfer node 4 establishes the bearer 40 with the base station 2 and also establishes a core network bearer (CNB) 30 with the external gateway 5, for transferring user packets of the mobile terminal 1. In the case of the UMTS, for example, the transfer node 4 includes user plane functions of the SGSN. In the case of the EPS, the transfer node 4 includes an S-GW. The CNB 30 corresponds to, for example, the CNB in the UMTS, or an S5/S8 bearer in the EPS. As will be described below, the CNB 30 according to this exemplary embodiment is shared among a plurality of mobile terminals 1 for transferring user packets thereof. In the following description, the CNB 30 is referred to as a "shared CNB" to differentiate the CNB 30 from a normal CNB that is created per each mobile terminal (or dedicated for one mobile terminal). In this exemplary embodiment, the shared CNB 30 is shared among a plurality of mobile terminals 1 per each base station 2.

The external gateway 5 transfers user packets of the mobile terminal 1 between the transfer node 4 and the external network 9. The external gateway 5 establishes the shared CNB 30 with the transfer node 4. The external gateway 5 further allocates an address (e.g., IP address) allocated to the mobile terminal 1. In the case of the UMTS, for example, the external gateway 5 includes a GGSN. In the case of the EPS, the external gateway 5 includes a P-GW.

The subscriber information database 6 is a database that holds subscriber data of the mobile terminal 1, and corresponds to, for example, a Home Subscriber Server (HSS) or a Home Location Server (HLR). The subscriber information database 6 sends the subscriber data to the mobility management node 3 in response to a request from the mobility management node 3.

In the following description, with reference to FIGS. 2 to 8, a "reference example" including the architecture and the methods of the CNB sharing made by the present inventors will be described. This exemplary embodiment is based on this reference example. This reference example is disclosed in Japanese Patent Application No. 2011-217383, which is previously made by the present inventors. The reference example described below is not publicly known at the time of filing this patent application, and is the technical ideas owned by the present inventors.

Reference Example

In the reference example, the CN 20 creates the shared CNB 30 between the transfer node 4 and the external gateway 5, the shared CNB which is shared for transferring user plackets of the plurality of mobile terminals 1 connected to the base station 2. The CN 20 provides a one-to-one mapping between the shared CNB 30 and the bearer 40 in the transfer node 4. Specifically, the shared CNB 30 is mapped one-to-one to the bearer 40 provided between the transfer node 4 and the base station 2. When an arbitrary one of the plurality of mobile terminals 1 performs communication, the CN 20 uses the shared CNB 30 and the bearer 40 for this arbitrary one of the plurality of mobile terminals. Accordingly, the transfer node 4 is only required to manage the mapping between one shared CNB 30 and one bearer 40 for user packet transfer of the plurality of mobile terminals 1. It is therefore possible to reduce the capacity of a bearer management table which should be managed by the transfer node 4 and to reduce the amount of processing by the transfer node 4. Further, the number of CNBs treated by the external gateway 5 decreases, whereby it possible to reduce the capacity of the bearer management table which should be managed by the external gateway 5.

FIG. 2 shows one example of the bearer management table of the external gateway 5 in the reference example. In the example shown in FIG. 2, information for identifying the shared CNB 30 (i.e., IP address of the transfer node 4 and CNB identifier) is associated with an IP address range allocated to the terminal group, not with the IP address allocated to the mobile terminal 1. Each of the two terminal group IP addresses shown in FIG. 2 is represented by IPv6 address notation and indicates a subnet number having a prefix length of 60 bits. For example, all user packets of the plurality of mobile terminals 1 to which IPv6 addresses included in the address range indicated by the subnet number "2001:DB8:1::/60" are respectively allocated are transferred to the shared CNB 30 specified by the IPv4 address "10.0.0.1" of the transfer node 4 and the CNB identifier "00001".

FIG. 3 shows one example of the bearer management table of the transfer node 4 according to the reference example. The bearer management table of the transfer node 4 is used to map the CNB to the RAB. The shared CNB 30 specified by the IPv4 address "10.1.0.1" of the external gateway 5 and the CNB identifier "00001" is mapped to, for example, the bearer 40 specified by the IPv4 address "10.0.1.1" of the base station 2 and the RAB identifier "00001".

The bearer management table shown in FIG. 3 is similar to a management table generally used by the transfer node 4 (e.g., SGSN, S-GW). As will be described later, however, the mobility management node 3 arbitrates bearer establishment requests (e.g., Attach Requests) and bearer recovery requests (e.g., Service Requests) that are originated from the plurality of mobile terminals 1 so that two or more mobile terminals 1 do not simultaneously use the shared CNB 30. Further, the external gateway 5 appropriately sets a packet filter (e.g., Traffic Flow Template (TFT)) on the shared CNB 30 so that user data regarding the plurality of mobile terminals 1 does not flow into the shared CNB 30. It is therefore possible to use the shared CNB 30 for transferring user packets of the plurality of mobile terminals 1 without special operations by the transfer node 4.

Next, in the following description, procedures for establishing and recovering a data bearer in the reference example will be described. As already stated above, the term "data bearer" in this specification means a communication path created between the external gateway 5 and the mobile terminal 1 for user data transfer. The data bearer is, for example, a UMTS bearer or an EPS bearer. Further, the "establishment" of the data bearer means that the data bearer is created for the first time because a correct bearer context is held neither in the RAN 10 nor in the CN 20. The "recovery" of the data bearer means re-configuration of the data bearer that has been previously created, and in particular, re-configuration of the RAB. The mobile communication system such as the UMTS and the EPS has preservation functions and releases the RAB in response to the transition of the mobile terminal 1 to the IDLE state (e.g., ECM-IDLE), while nodes in the CN 20 (i.e., mobility management node 3, transfer node 4, external gateway 5) and the mobile terminal 1 hold a data bearer context. Accordingly, when the data bearer is recovered, the RAB is re-configured based on the bearer context maintained by the preservation function.

Figure 4B:
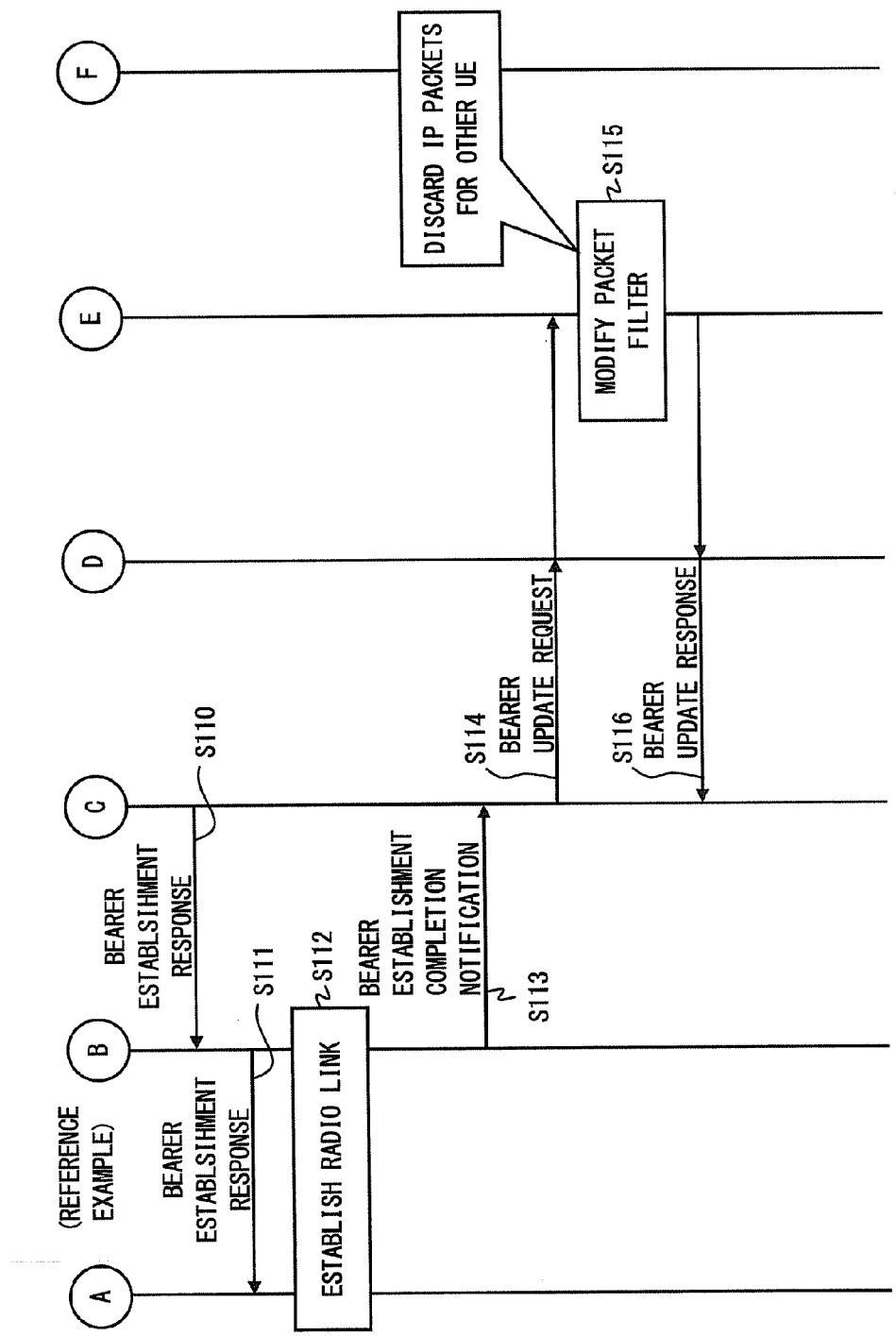
FIG. 4B is a sequence diagram showing one example of the bearer establishment procedure according to an exemplary embodiment (reference example)

The sequence diagrams shown in FIGS. 4A and 4B show the procedure for establishing a data bearer including the shared CNB 30 based on a request from any one of the mobile terminals 1 which is included in the terminal group. In Step S101, the mobile terminal 1 sends a bearer establishment request. In Step S102, the base station 2 transfers the bearer establishment request received from the mobile terminal 1 to the mobility management node 3. The bearer establishment request is, for example, an Attach Request in the EPS or an Activate PDP Context Request in the UMTS. In Step S103, the mobility management node 3 initiates authentication processing of the mobile terminal 1 in response to the reception of the bearer establishment request. The authentication processing includes an access to the subscriber information database 6. That is, the mobility management node 3 sends to the database 6 an identifier (e.g., International Mobile Subscriber Identity (IMSI)) of the terminal which has originated the bearer establishment request, and the mobility management node 3 receives the subscriber information of the mobile terminal 1 from the database 6. The subscriber information includes terminal group information. The terminal group information includes an identifier of the terminal group to which the mobile terminal 1 belongs, the number of terminals included in the group (the number of IP addresses needed) and the like.

The mobility management node 3 determines whether the data bearer for the mobile terminal 1 needs to be shared or not based on the terminal group information. When performing the bearer sharing, the mobility management node 3 sends to the transfer node 4 the bearer establishment request indicating that the bearer sharing is required (Step S104). For example, the mobility management node 3 may add bearer sharing information into the normal bearer establishment request. The normal bearer establishment request transmitted to the transfer node 4 may be, for example, a Create Session Request in the EPS or a Create PDP Context Request in the UMTS. The bearer sharing information may be information required to determine the number of IP addresses required for the terminal group. Specifically, the bearer sharing information may be the number of terminals included in the group (the number of IP addresses needed) obtained from the terminal group information.

In Step S105, in response to the reception of the bearer establishment request from the mobility management node 3, the transfer node 4 generates an entry regarding a new data bearer in the bearer management table, and sends the bearer establishment request (including the bearer sharing information) to the external gateway 5. In Step S106, in response to the reception of the bearer establishment request including the bearer sharing information, the external gateway 5 allocates, for the terminal group, an address range that satisfies the number of IP addresses needed. Further, the external gateway 5 sets the QoS according to the terminal group in the shared CNB 30 as needed. The external gateway 5 generates an entry regarding the new shared CNB 30 in the bearer management table based on, for example, a tunnel endpoint identifier on the side of the transfer node 4 received from the transfer node 4, and an IP address range allocated to the terminal group. After that, in Step S107, the external gateway 5 sends a bearer establishment response to the transfer node 4. This bearer establishment response includes an IP address range, and a tunnel endpoint identifier on the side of the external gateway 5. Further, the bearer establishment response may include additional information such as a data bearer QoS. The bearer establishment response is, for example, a Create Session Response in the EPS or a Create PDP Context Response in the UMTS.

In Step S108, the transfer node 4 modifies information of the shared CNB 30 in the bearer management table in response to the reception of the bearer establishment response from the external gateway 5, and sends the bearer establishment response to the mobility management node 3. The bearer establishment response includes the tunnel endpoint identifier on the side of the transfer node 4 of the RAB (including the bearer 40) which is mapped to the shared CNB 30 in the transfer node 4. Further, the bearer establishment response indicates the IP address range allocated to the terminal group. In the case of the UMTS, the function of the mobility management node 3 and the function of the transfer node 4 are aggregated in the SGSN. The bearer establishment response in Step S108 therefore corresponds to an internal message in the SGSN.

In Step S109, the mobility management node 3 receives the bearer establishment response from the transfer node 4. The mobility management node 3 determines one IP address allocated to the mobile terminal 1 from the IP address range allocated to the terminal group by the external gateway 5. In Step S110, the mobility management node 3 sends a control message including the bearer establishment response to the base station 2. The bearer establishment response is information sent to the mobile terminal 1, and includes, for example, the IP address allocated to the mobile terminal 1, and the data bearer identifier. The control message, which includes the bearer establishment response, further includes, for example, the tunnel endpoint identifier on the side of the transfer node 4 of the bearer 40, and the bearer QoS. The bearer establishment response is, for example, an Attach Accept in the EPS or an Activate PDP Context Accept in the UMTS. Further, the control message including the bearer establishment response is, for example, an S1-AP message in the EPS (specifically, Initial Context Setup Request).

In Steps S111 and S112, the base station 2 transfers the bearer establishment response to the mobile terminal 1 and executes processing for establishing a radio link (i.e., radio bearer 50) for the mobile terminal 1. In Step S113, the base station 2 sends a bearer establishment completion notification to the mobility management node 3. The bearer establishment completion notification indicates bearer configuration completion in the base station 2 and bearer configuration completion in the mobile terminal 1. The bearer establishment completion notification may be transmitted by two separate messages. The bearer establishment completion notification may be, for example, an Initial Context Response and an Attach Complete which are used in the EPS.

In Step S114, the mobility management node 3 sends a bearer update request to the transfer node 4 in response to the reception of the bearer establishment completion notification. The bearer update request includes a tunnel endpoint identifier on the side of the base station 2 of the bearer 40. The transfer node 4 modifies the bearer management table based on the bearer update request. The bearer update request is, for example, a Modify Bearer Request in the EPS. In the case of the UMTS, the function of the mobility management node 3 and the function of the transfer node 4 are aggregated in the SGSN. The bearer update request in Step S114 thus corresponds to the internal message in the SGSN.

Further, in Step S114, the transfer node 4 sends the bearer update request to the external gateway 5 in order to update a packet filter in the external gateway 5. This bearer update request triggers the external gateway 5 to set, on the shared CNB 30, the packet filter which discards the user packets destined for other addresses than the IP address allocated to the mobile terminal 1 by the mobility management node 3. The bearer update request transmitted from the transfer node 4 to the external gateway 5 is, for example, a Modify Bearer Request in the EPS or an Update PDP Context Request in the UMTS.

In Step S115, the external gateway 5 modifies the packet filter applied to the shared CNB 30. Accordingly, the external gateway 5 transfers, through the shared CNB 30, user packets regarding only one mobile terminal 1 which actually performs communication among the plurality of mobile terminals 1 included in the terminal group. In Step S116, the external gateway 5 sends a bearer update response to the transfer node 4, and the transfer node 4 sends a bearer update response to the mobility management node 3. The bearer update response transmitted to the transfer node 4 from the external gateway 5 is, for example, a Modify Bearer Response in the EPS or an Update PDP Context Response in the UMTS.

Figure 5A:
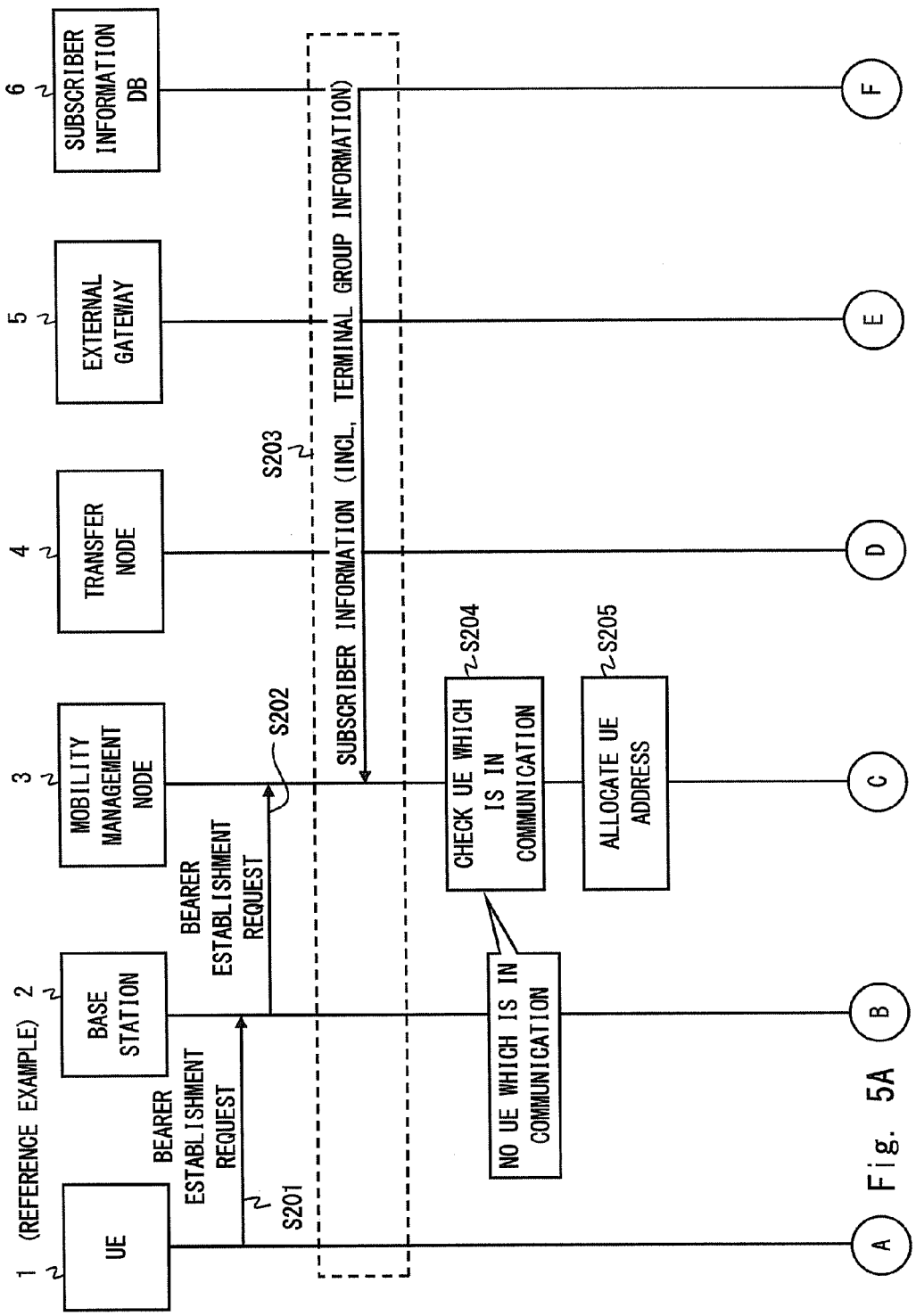
FIG. 5A is a sequence diagram showing one example of the bearer establishment procedure according to an exemplary embodiment (reference example)
Figure 5B:
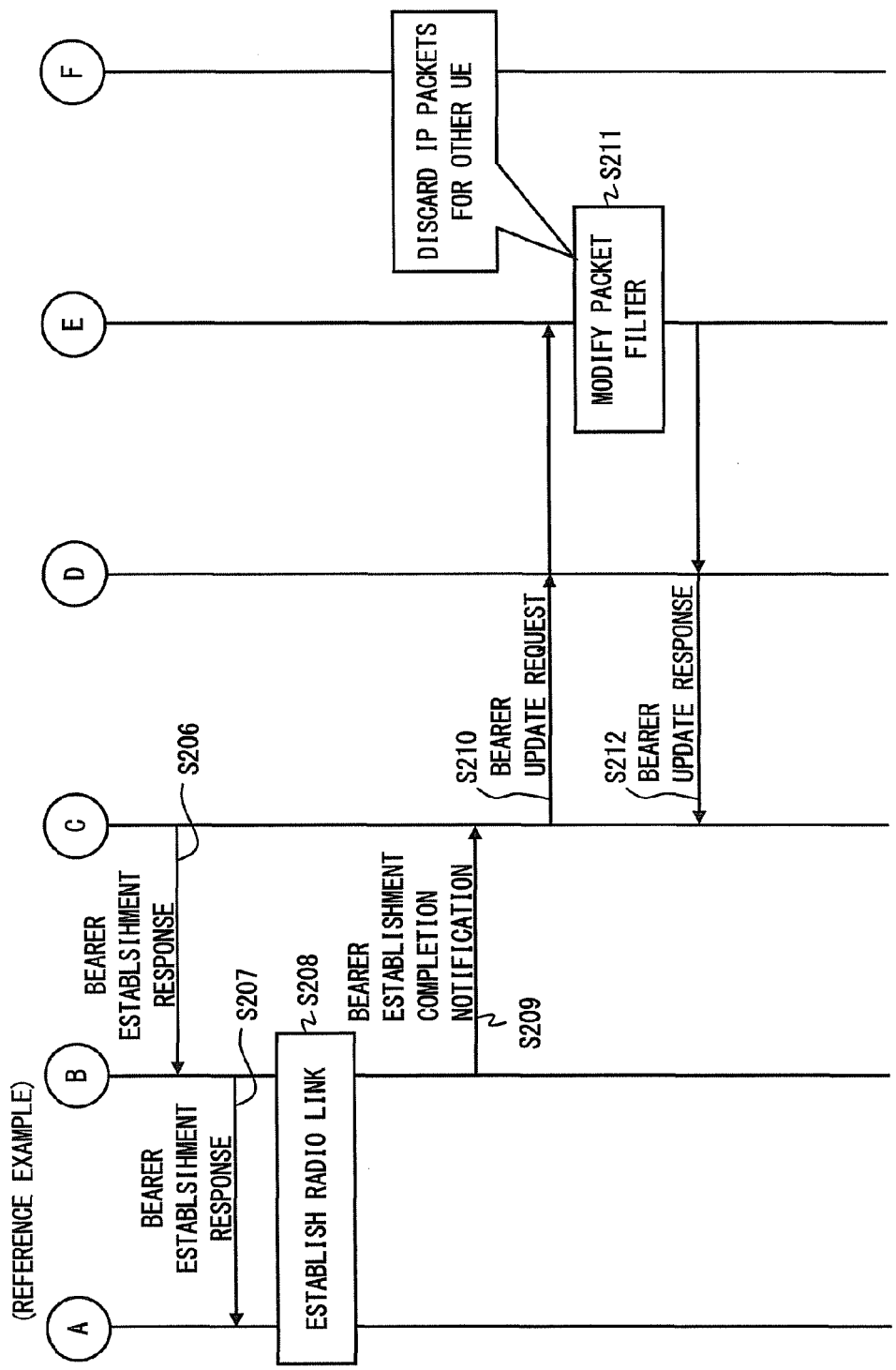
FIG. 5B is a sequence diagram showing one example of the bearer establishment procedure according to an exemplary embodiment (reference example)
Figure 6:
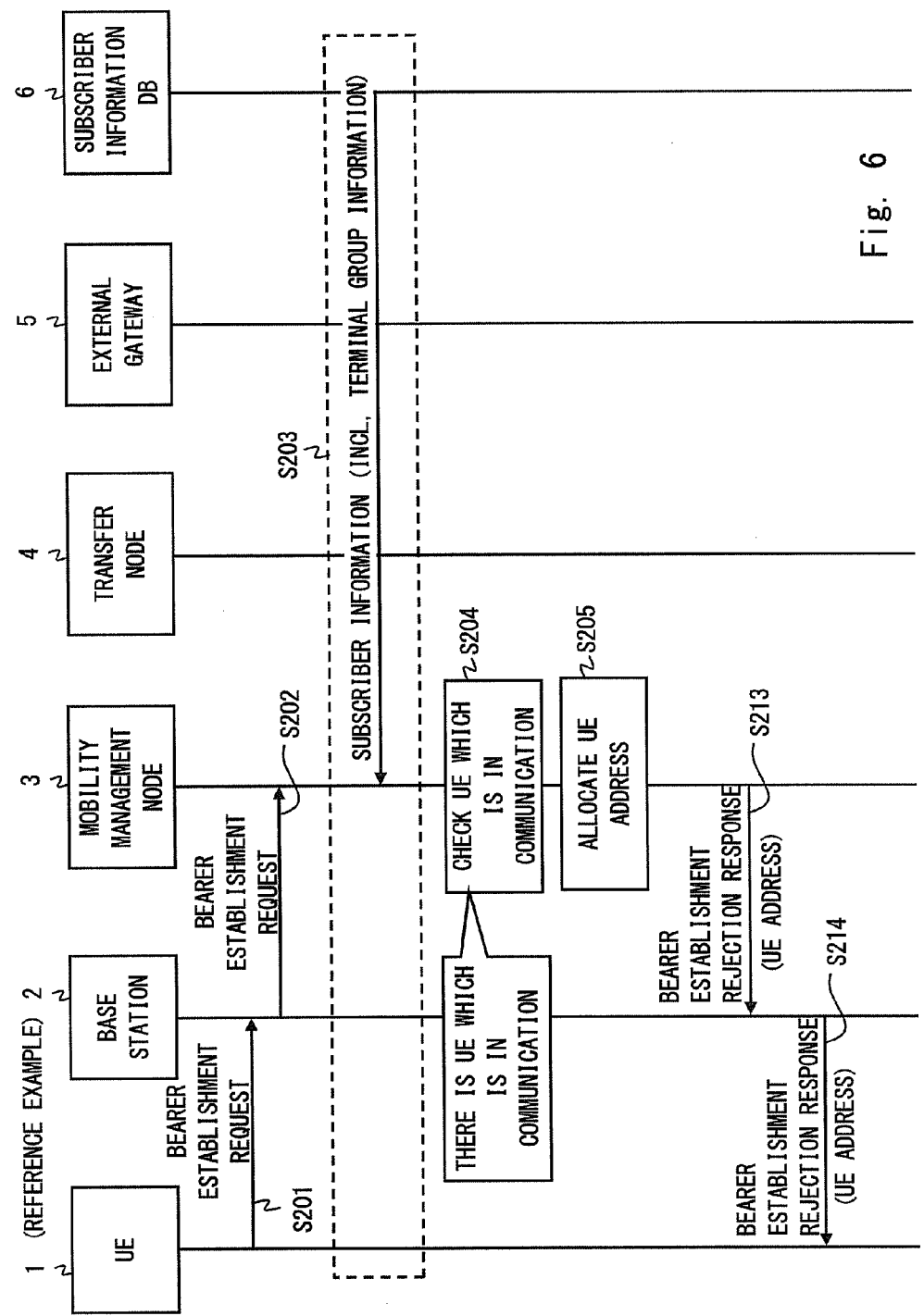
FIG. 6 is a sequence diagram showing one example of the bearer establishment procedure according to an exemplary embodiment (reference example)

In the following description, processing of the bearer establishment request from the second or subsequent mobile terminal 1 belonging to the same terminal group and being connected to the base station 2 will be described. FIGS. 5A, 5B, and 6 are sequence diagrams showing examples of a processing procedure of the bearer establishment request from the second or subsequent mobile terminal 1. FIGS. 5A and 5B show the processing procedure when there is no mobile terminal 1 which is in communication. On the other hand, FIG. 6 shows the procedure of the processing when there is a mobile terminal 1 which is in communication.

First, the procedure of FIGS. 5A and 5B will be described. The processes in Steps S201 to S203 are similar to those in Steps S101 to S103 shown in FIG. 4A. In Step S204, the mobility management node 3 determines whether the data bearer for the mobile terminal 1 needs to be shared or not based on the terminal group information. The mobility management node 3 then checks whether there is a mobile terminal 1 which is in communication regarding the terminal group to which the mobile terminal 1 that has originated the bearer establishment request belongs. This check may be performed based on the bearer context held by the mobility management node 3. Alternatively, this check may be performed by querying the communication management unit 7. In the example shown in FIG. 5A, the mobility management node 3 determines that there is no mobile terminal 1 which is in communication, and the mobility management node 3 allocates an IP address to the second or subsequent mobile terminal 1 from the reserved IP address range. Steps S206 to S212 are similar to Steps S110 to S116 shown in FIG. 4A and FIG. 4B.

Next, the bearer establishment procedure when there is a mobile terminal 1 which is in communication will be described. The processes in Steps S201 to S205 shown in FIG. 6 are similar to those in Steps S201 to S205 shown in FIG. 5A. In Step S204 shown in FIG. 6, however, the mobility management node 3 determines that there is a mobile terminal 1 which is in communication regarding the terminal group to which the mobile terminal 1 that has originated the bearer establishment request belongs. As already stated above, in the reference example, the plurality of terminals 1 in the same terminal group connected to the same base station 2 cannot perform simultaneous communication. Accordingly, the mobility management node 3 sends a bearer establishment rejection response to the mobile terminal 1 through the base station 2 (Steps S213 and S214). In the example shown in FIG. 6, the bearer establishment rejection response includes an IP address allocated to the mobile terminal 1. The mobile terminal 1 that has received the bearer establishment rejection response may therefore transition to the IDLE state in which the mobile terminal 1 is registered in the CN 20 and the RAB is released instead of going back to a detach state. Further, the mobility management node 3 may add, into the bearer establishment rejection response, a backoff notification which requires the mobile terminal 1 to backoff transmission of the next bearer establishment request (or bearer recovery request). In this case, the mobile terminal 1 suppresses transmission of the next bearer establishment request (or bearer recovery request) during the backoff time that is determined in advance or randomly determined.

Figure 7:
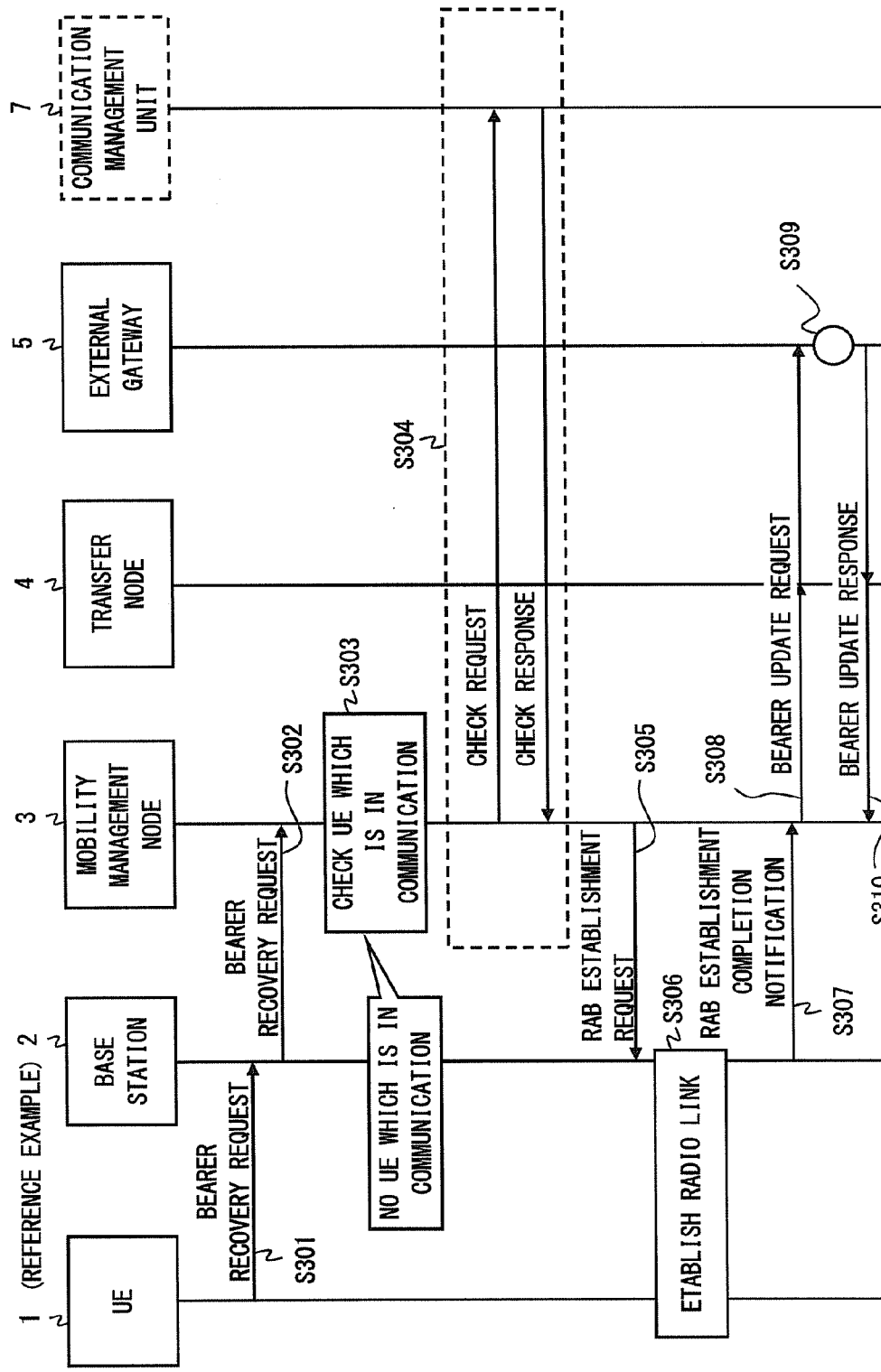
FIG. 7 is a sequence diagram showing one example of a bearer recovery procedure according to an exemplary embodiment (reference example)
Figure 8:
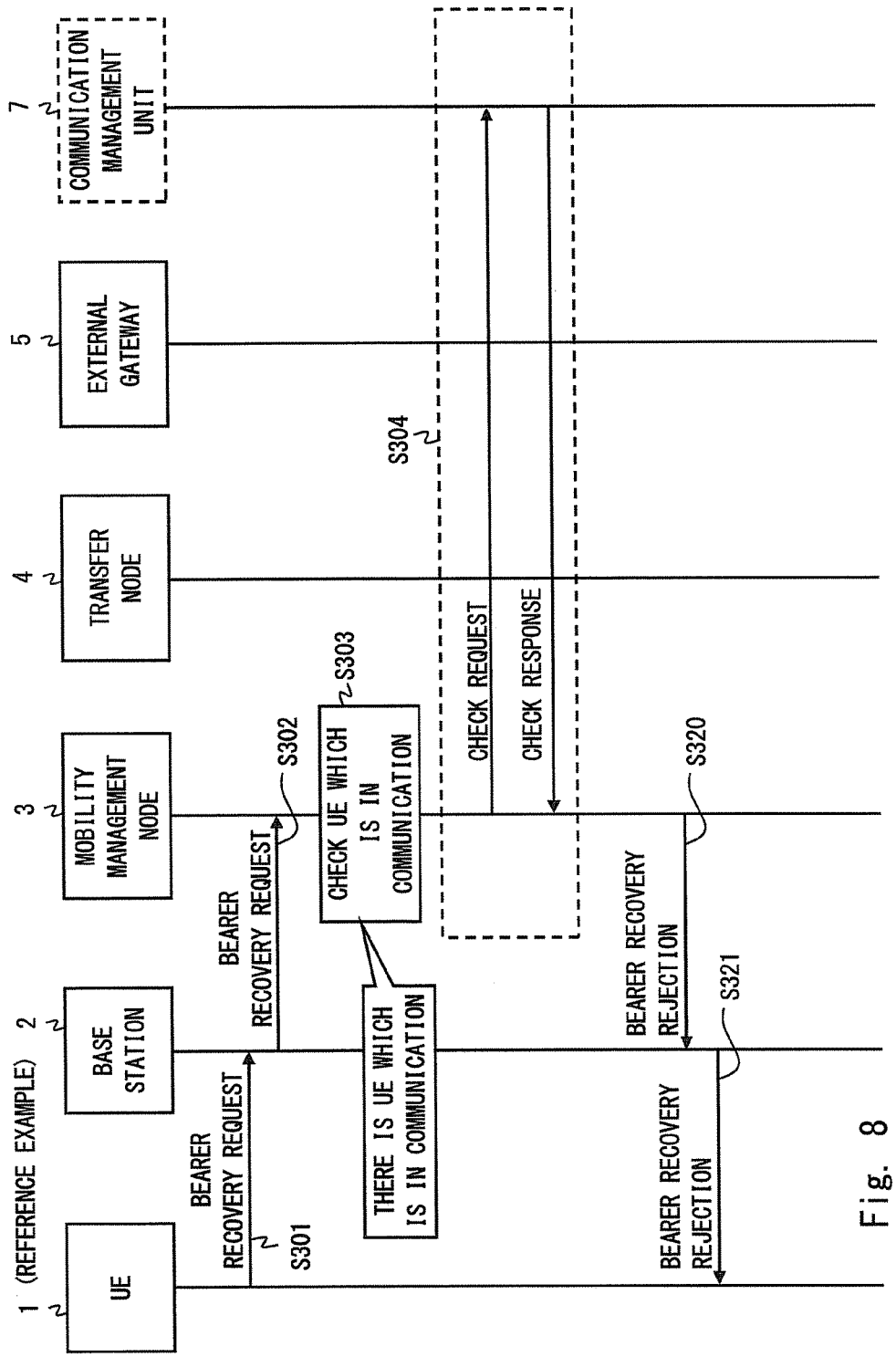
FIG. 8 is a sequence diagram showing one example of the bearer recovery procedure according to an exemplary embodiment (reference example)

In the following description, with reference to FIGS. 7 and 8, a procedure for recovering the data bearer according to the reference example will be described. FIG. 7 shows a processing procedure when there is no mobile terminal 1 which is in communication. Meanwhile, FIG. 8 shows a processing procedure when there is a mobile terminal 1 which is in communication. In Step S301 shown in FIG. 7, the mobile terminal 1 sends a bearer recovery request. In Step S302, the base station 2 transfers the bearer recovery request received from the mobile terminal 1 to the mobility management node 3. The bearer recovery request is, for example, a Service Request in the EPS or a Service Request in the UMTS. In Step S303, it is checked whether a mobile terminal 1 belonging to the terminal group, to which the mobile terminal 1 that has originated the bearer recovery request belongs, and being connected to the same base station 2 is in communication, or whether the shared CNB 30 and the bearer 40 are already being used. This check may be performed by querying the communication management unit 7 as in Step S304.

When it is determined in Step S303 that there is no mobile terminal 1 which is currently in communication, the mobility management node 3 executes a procedure for establishing the RAB (bearer 40 and radio bearer 50) (Steps S305 to S307). That is, the mobility management node 3 sends an RAB establishment request to the base station 2 (Step S305). The RAB establishment request is, for example, an S1-AP Initial Context Setup Request in the EPS or a Radio Access Bearer Assignment Request in the UMTS. In Step S306, the base station 2 establishes the radio link (radio bearer 50) with the mobile terminal 1. In Step S307, the base station 2 sends an RAB establishment completion notification indicating the completion of the configuration of the RAB (bearer 40 and radio bearer 50) to the mobility management node 3. The RAB establishment completion notification is, for example, an S1-AP Initial Context Setup Complete in the EPS or a Radio Access Bearer Assignment Response in the UMTS.

The processes in Steps S308 to S310 are similar to those in Steps S114 to S116 shown in FIG. 4B or Steps S210 to S212 shown in FIG. 5B. That is, in Steps S308 to S310, the transfer node 4 updates the endpoint identifier on the side of the base station of the bearer 40. Further, in Step S309, the external gateway 5 updates the packet filter (e.g., TFT) to prevent, from flowing through the shared CNB 30, packets of other mobile terminals 1 than the mobile terminal 1 which makes a transition to a communication state.

Next, a bearer recovery procedure when there is a mobile terminal 1 which is in communication will be described. The processes in Steps S301 to S304 shown in FIG. 8 are similar to Steps S301 to S304 shown in FIG. 7. However, in Step S303 shown in FIG. 8, it is determined that there is a mobile terminal 1 which is currently in communication. In the reference example, the plurality of terminals 1 in the same terminal group connected to the same base station 2 cannot perform simultaneous communication. Accordingly, the mobility management node 3 sends a bearer recovery rejection response to the mobile terminal 1 through the base station 2 (Steps S320 and S321). The bearer recovery rejection response is, for example, a service reject in the EPS or a service reject in the UMTS. The mobility management node 3 may add, into the bearer recovery rejection response, a notification to backoff the transmission of the next bearer recovery request from the mobile terminal 1. In this case, the mobile terminal 1 suppresses transmission of the next bearer recovery request during the backoff time that is determined in advance or determined randomly.

As stated above, in the architecture and the methods according to the reference example, the shared CNB 30 is shared for transferring user packets regarding the plurality of mobile terminals 1. Further, not only the endpoint configuration of the shared CNB 30, the endpoint configuration of the bearer 40 managed in the transfer node 4 is also commonly used for transferring user packets of the plurality of mobile terminals 1. Accordingly, the number of bearer contexts that should be managed by the transfer node 4 and the external gateway 5 can be reduced. In summary, typically, the transfer node 4 and the external gateway 5 only required to maintain the context regarding one shared CNB 30 for the plurality of mobile terminals 1. Accordingly, the architecture and the methods according to the reference example are able to reduce the processing load required to maintain the bearer in the transfer node 4 and the external gateway 5.

In the architecture and the methods of sharing the CNB according to the reference example, however, two or more terminals 1 which belong to the same terminal group and are connected to the same base station 2 cannot perform simultaneous communication. Specifically, the mobility management node 3 arbitrates bearer recovery requests and bearer establishment requests that are originated from two or more mobile terminals 1, within the same terminal group and connected to the same base station 2, so as not to allocate the shared CNB 30 simultaneously to these two or more mobile terminals 1. That the simultaneous communication cannot be performed does not cause a large problem when (a) the frequency of communication of a plurality of mobile terminals 1 belonging to the terminal group is low, (b) the communication duration of each mobile terminal 1 is short, or (c) each mobile terminal 1 has delay tolerant characteristics. Accordingly, it is expected that the architecture and the methods according to the reference example show remarkable effects when applied to applications having such communication characteristics (e.g., some of Machine Type Communication (MTC) applications).

In a situation in which the frequency of communication of the mobile terminal 1 is not very low and the timings of communication of the plurality of mobile terminals 1 overlap with some degree of probability, however, it is preferable that the occurrence of call loss can be suppressed. The present inventors have examined improvements to suppress the occurrence of call loss in detail in the architecture that uses the shared CNB 30 for transferring user packets of a plurality of mobile terminals 1, and have obtained some improved architectures and methods. In the following description, improvements 1 to 3 obtained by the present inventors will be described in series. The improvement 1 will be described in this exemplary embodiment, and improvements 2 and 3 will be described in the second and third exemplary embodiments, respectively.

Improvement 1

Figure 9:
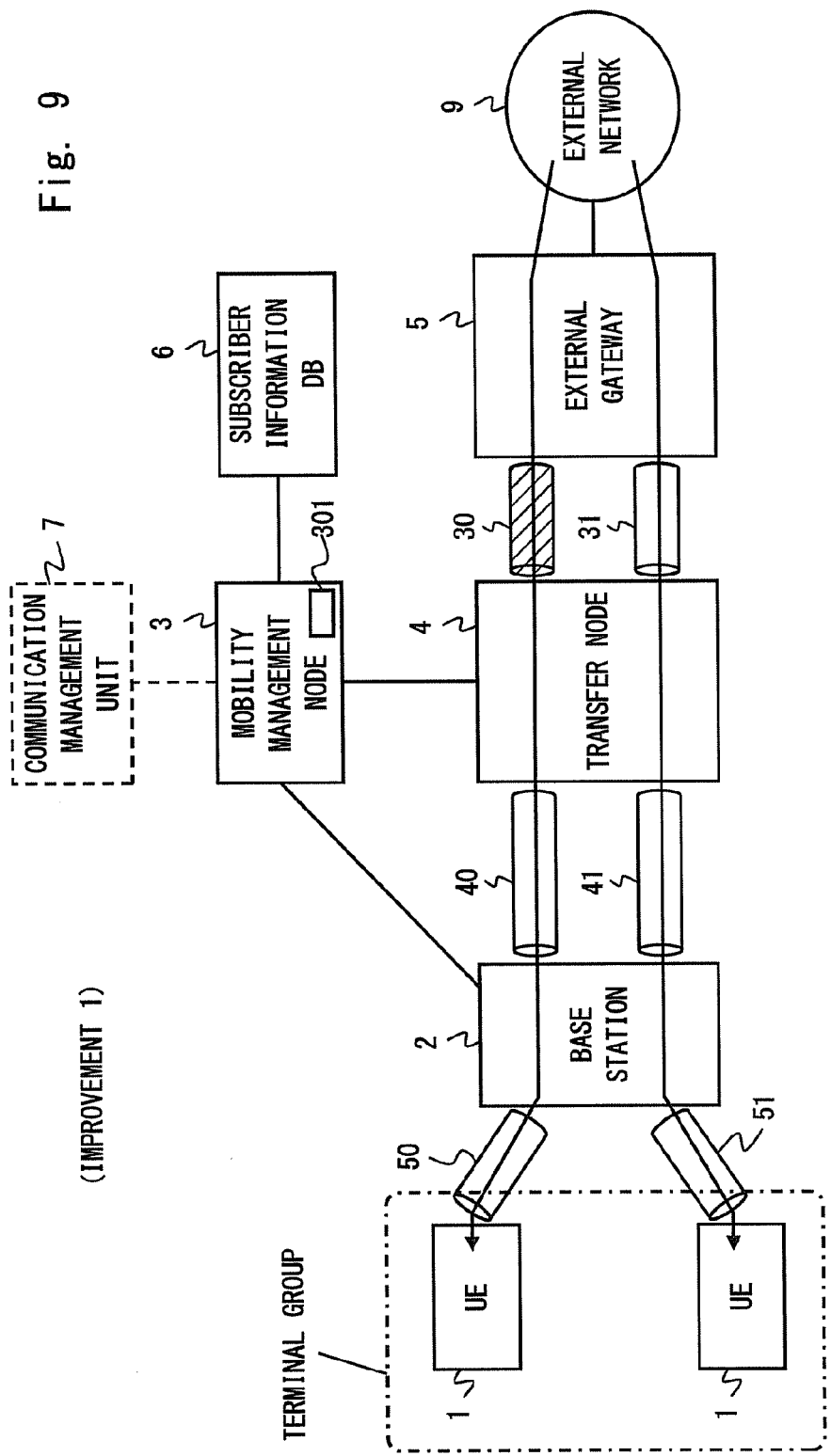
FIG. 9 is a block diagram showing a configuration example of a mobile communication system according to an exemplary embodiment (improvement 1)

FIG. 9 is a diagram showing a network and a bearer configuration according to the improvement 1 when two or more mobile terminals are simultaneously communicating. When the timings of communication of two or more mobile terminals which belong to the same terminal group and are connected to the same base station 2 do not overlap with each other, the operation of the mobile communication system according to the improvement 1 is the same as that in the reference example. In short, the mobile communication system according to the improvement 1 is able to perform data packet transfer only using the shared CNB 30 unless the timings of communication of two or more mobile terminals 1 overlap with each other. In this case, not only the endpoint configuration of the shared CNB 30 managed in the transfer node 4 and the external gateway 5, the endpoint configuration of the bearer 40 managed in the transfer node 4 is also commonly used for the user packet transfer of the plurality of mobile terminals 1. Accordingly, the number of bearer contexts that should be managed by the transfer node 4 and the external gateway 5 can be reduced and the processing load required to maintain the bearer can be reduced.

On the other hand, when the timings of communication of two or more mobile terminals 1 are overlapped, the CN 20 according to the improvement 1 creates and uses an additional data bearer (i.e., additional CNB 31, additional bearer 41, and additional radio bearer 51) for each of the second and subsequent mobile terminals 1. The additional data bearer may be a normal data bearer that does not use the shared CNB. In summary, when the timings of communication of two or more mobile terminals 1 in the same terminal group incidentally overlap with each other, the mobile communication system according to the improvement 1 temporarily creates the normal data bearer to address this situation. Accordingly, the mobile communication system according to the improvement 1 allows simultaneous communication of the plurality of mobile terminals 1 which belong to the same terminal group, whereby it is possible to suppress the occurrence of call loss.

The CN 20 according to the improvement 1 may release the configuration in the CN 20 regarding the additional data bearer (additional CNB 31, additional bearer 41, and additional radio bearer 51) in response to the completion of communication of each of the second and subsequent mobile terminals 1. More specifically, although the bearer context is maintained in the CN 20 in the normal preservation function, the CN 20 according to the improvement 1 may release the configuration in the CN 20 regarding the additional data bearer when each of the second and subsequent mobile terminals 1 ends the communication and transitions to the IDLE state. In the next communication of the mobile terminal 1 which has made a transition to the IDLE state, the shared CNB 30 is used if the shared CNB 30 is not being used.

Figure 10:
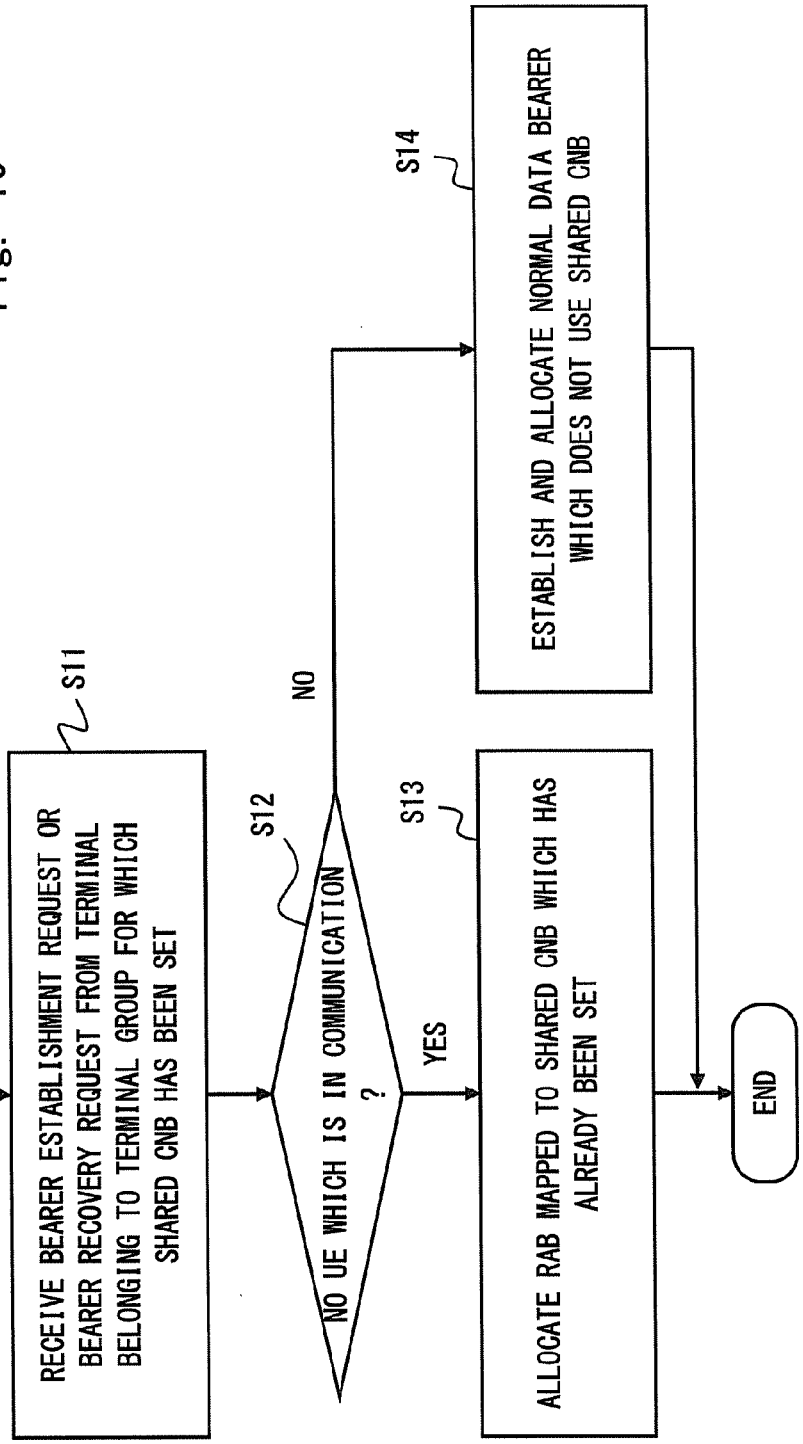
FIG. 10 is a flowchart showing one example of a bearer establishment procedure or a bearer recovery procedure according to an exemplary embodiment (improvement 1)

Next, in the following description, the detail of a processing procedure for achieving the improvement 1 will be described. FIG. 10 is a flowchart showing an operation example of the mobility management node 3 according to the improvement 1. In Step S11, the mobility management node 3 (controller 301) receives a bearer establishment request or a bearer recovery request from the mobile terminal 1 of the terminal group for which the shared CNB 30 has been set. In Step S12, the mobility management node 3 (controller 301) determines whether a mobile terminal (UE) 1 belonging to the terminal group, to which the mobile terminal that has originated the bearer recovery request belongs, and being connected to the same base station 2 is in communication. When there is no mobile terminal 1 which is in communication (YES in Step S12), the mobility management node 3 (controller 301) controls the mobile terminal 1, the base station 2, and the transfer node 4 to create the RAB to be mapped to the shared CNB 30, which has already been created, and to allocate the RAB to the mobile terminal 1, similar to FIG. 5A, 5B, or 7 regarding the reference example (Step S13). Meanwhile, when there is a mobile terminal 1 which is in communication (NO in Step S12), the mobility management node 3 (controller 301) controls the mobile terminal 1, the base station 2, the transfer node 4, and the external gateway 5 to execute the bearer establishment procedure to newly create an additional data bearer (CNB 31, bearer 41, and radio bearer 51), and to allocate this additional data bearer to the mobile terminal 1 (Step S14).

FIG. 11 shows one example of the bearer management table of the external gateway 5 according to the improvement 1. When two mobile terminals 1 simultaneously perform communication, the external gateway 5 modifies the bearer management table (and packet filter based on the bearer management table) to flow user packets destined for the IP address allocated to the second mobile terminal 1 to the additional CNB 31. In summary, the external gateway 5 adds an entry regarding the additional CNB 31 to the bearer management table. As will be understood from the comparison between FIG. 11 and FIG. 2, the management table shown in FIG. 11 includes a third entry regarding the additional CNB 31. In the third entry shown in FIG. 11, an IPv6 address "2001:DB8:3:1::/64" is associated with the additional CNB 31 specified by the IPv4 address "10.0.0.1" of the transfer node 4 and the CNB identifier "00003". The IPv6 address "2001:DB8:1:1::164" is not the subnet number as an address range and is an IPv6 address allocated to one mobile terminal 1.

The external gateway 5 may determine the CNB to which user packets are sent by performing longest matching using the management table shown in FIG. 11. The external gateway 5 is therefore able to send the user packets of the second mobile terminal 1, to which the IPv6 address "2001:DB8:1:1::/64" is allocated, to the additional CNB 31 not to the shared CNB 30.

FIG. 12 shows one example of the bearer management table of the transfer node 4 according to the improvement 1. As will be understood from the comparison between FIG. 12 and FIG. 3, a third entry, which indicates the mapping between the additional CNB 31 and the additional bearer 41, is added in FIG. 12. In the example shown in FIG. 12, the additional bearer 41 is specified by the IP address "10.0.1.1" of the base station 2 and the RAB identifier "00002".

Figure 13B:
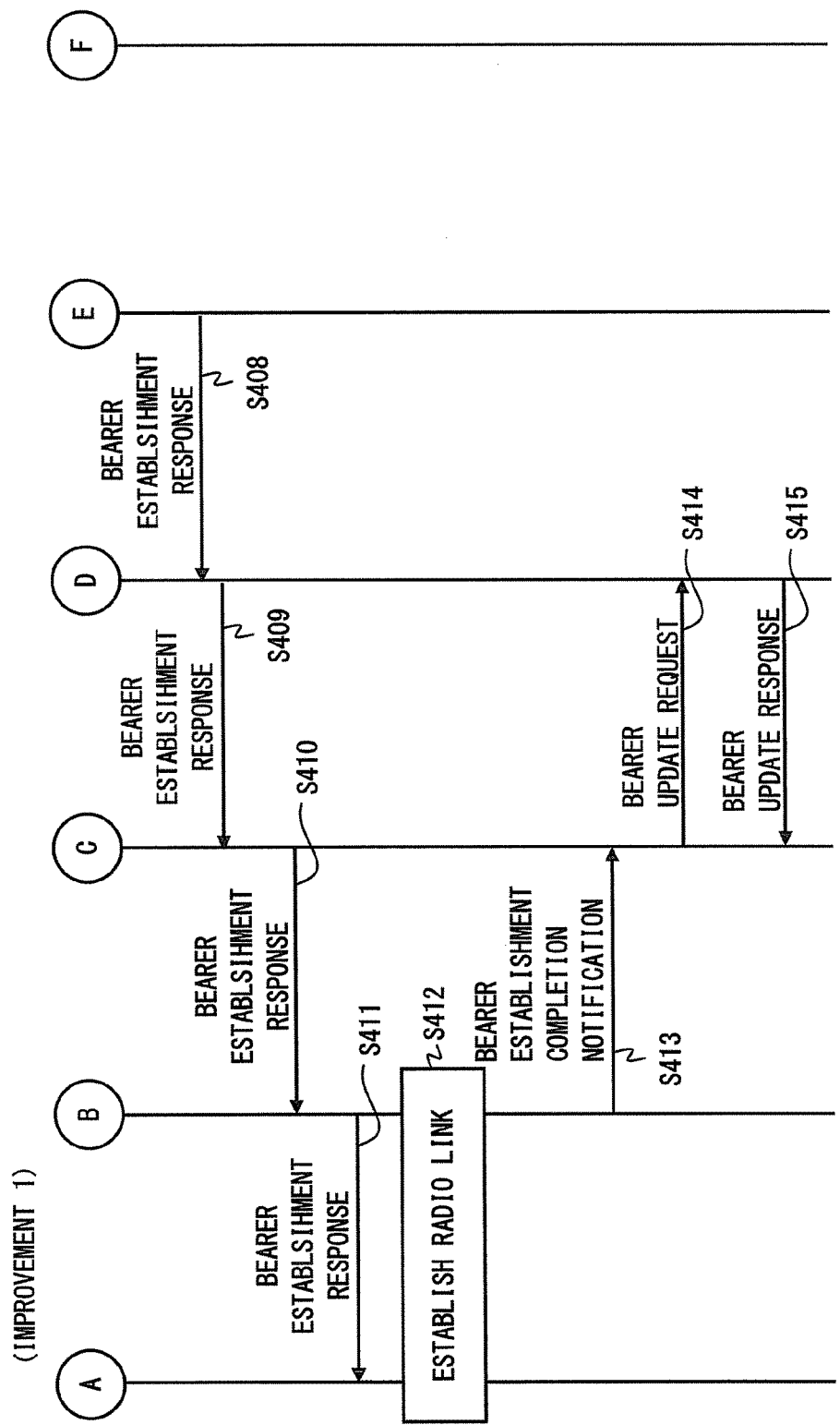
FIG. 13B is a sequence diagram showing one example of the bearer establishment procedure according to an exemplary embodiment (improvement 1)

In the following description, specific examples of the additional data bearer establishment procedure according to the improvement 1 will be described. FIGS. 13A and 13B are sequence diagrams showing processing examples of the bearer establishment request from the second or subsequent mobile terminal 1 belonging to the same terminal group and being connected to the same base station 2, and show a processing procedure when there is a mobile terminal 1 which is in communication. When there is no mobile terminal 1 which is in communication, the bearer establishment request may be processed in the procedure similar to the sequence according to the reference example shown in FIGS. 5A and 5B.

The processes in Steps S201 to S205 shown in FIG. 13A are similar to Steps S201 to S205 shown in FIG. 5A or FIG. 6. In Step S204 shown in FIG. 13A, the mobility management node 3 determines that there is a mobile terminal 1 which is in communication regarding the terminal group to which the mobile terminal 1 that has originated the bearer establishment request belongs. After that, in the reference example shown in FIG. 6, the mobility management node 3 rejects the bearer establishment. Meanwhile, in the improvement 1 shown in FIG. 13A, the mobility management node 3 sends the bearer establishment request to the transfer node 4 to create an additional bearer (Step S406). The bearer establishment request in Step S406 is a message to establish the data bearer which uses the normal CNB, not the shared CNB. Accordingly, the bearer establishment request in Step S406 includes the IP address which has allocated to the mobile terminal 1 by the mobility management node 3, but does not include bearer sharing information.

In Step S407, in response to the reception of the bearer establishment request, the transfer node 4 adds an entry regarding a new data bearer into the bearer management table, and sends a bearer establishment request (including the IP address of the mobile terminal 1) to the external gateway 5. In Step S408, the external gateway 5 configures a normal CNB for the IP address of the mobile terminal 1 which is specified by the bearer establishment request, and adds a new entry into the bearer management table. The external gateway 5 then sends a bearer establishment response to the transfer node 4. The processes in the following Steps S409 to S415 may be similar to, for example, the procedure for establishing the normal data bearer (e.g., procedure disclosed in the section 5.3.1 "Attach procedure" of Non-patent literature 1.

Figure 14:
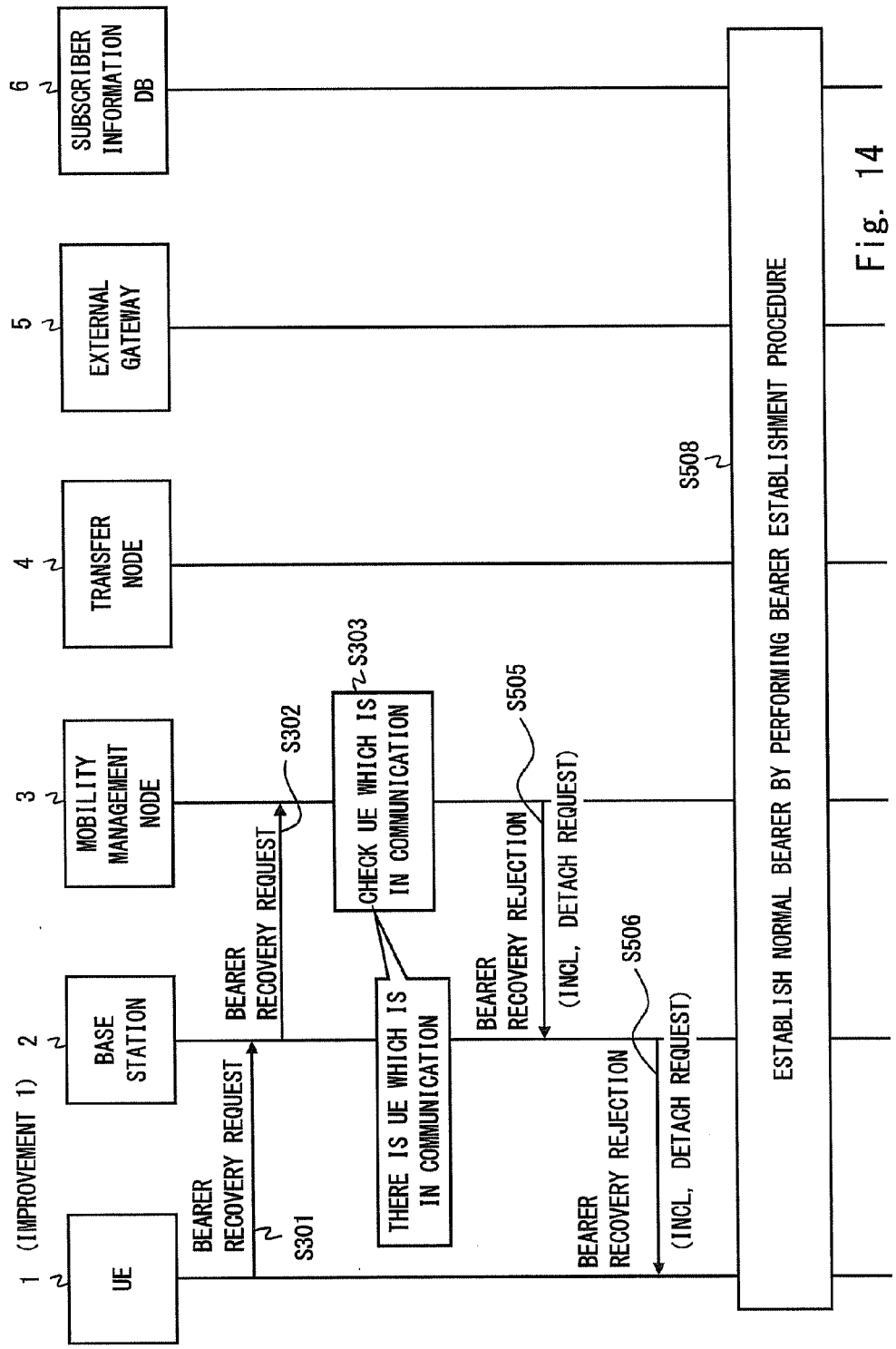
FIG. 14 is a sequence diagram showing one example of a bearer recovery procedure according to an exemplary embodiment (improvement 1)

Next, with reference to FIG. 14, a specific example of the bearer recovery procedure according to the improvement 1 will be described. The processes in Steps S301 to S303 in FIG. 14 are similar to Steps S301 to S303 in FIG. 8 according to the reference example. In Step S303 shown in FIG. 14, the mobility management node 3 determines that another mobile terminal being connected to the same base station 2 and belonging to the same terminal group as the mobile terminal 1 which has originated the bearer recovery request is in communication. After that, in the reference example shown in FIG. 8, the mobility management node 3 rejects the bearer recovery. Meanwhile, in the improvement 1 shown in FIG. 14, the mobility management node 3 rejects the bearer recovery and requests the mobile terminal 1 to detach (i.e., disconnection from the CN 20) (Steps S505 and S506). The bearer recovery rejection message transmitted in Steps S505 and S506 in FIG. 14 includes a detach request. Accordingly, the mobile terminal 1 sends an attach request, not a bearer recovery request, and thus the mobility management node 3 creates an additional data bearer according to the sequence shown in FIGS. 13A and 13B in response to the reception of the attach request (Step S508).

Note that the procedure shown in FIG. 14 is merely one example. When it is determined in S303 shown in FIG. 14 that there is a mobile terminal 1 which is in communication, the CN 20 and the RAN 10 may execute the bearer establishment procedure or the bearer addition procedure instead of performing the bearer recovery procedure, so as to establish the additional data bearer. The CN 20 and the RAN 10 may perform, for example, processes in Steps S406 to S415 of the bearer establishment procedure shown in FIGS. 13A and 13B after Step S303 shown in FIG. 14. Further, the "addition" of the data bearer means additionally setting a dedicated data bearer in the connection (e.g., Packet Data Network (PDN) connection) that is same as the existing data bearer. The procedure for adding the data bearer to the existing connection is disclosed, for example, in the section 5.4.5 "UE requested bearer resource modification" of Non-patent literature 1.

As already stated above, the CN 20 and the RAN 10 may release the additional data bearer created according to the procedure in FIG. 13A, 13B or 14 in response to the completion of the communication of the mobile terminal 1. The mobility management node 3 may control the base station 2, the transfer node 4, and the external gateway 5, for example, to delete the configuration of the additional CNB 31, not only the configuration of the additional RAB (bearer 41 and radio bearer 51), in response to the transition of the mobile terminal 1 to the IDLE state.

Second Exemplary Embodiment

Described in the first exemplary embodiment is one of the improved architectures and methods which can suppress the occurrence of call loss when the shared CNB 30 is used for user packet transfer of the plurality of mobile terminals 1. In this exemplary embodiment, another improved architecture and methods will be described.

Improvement 2

Figure 15:
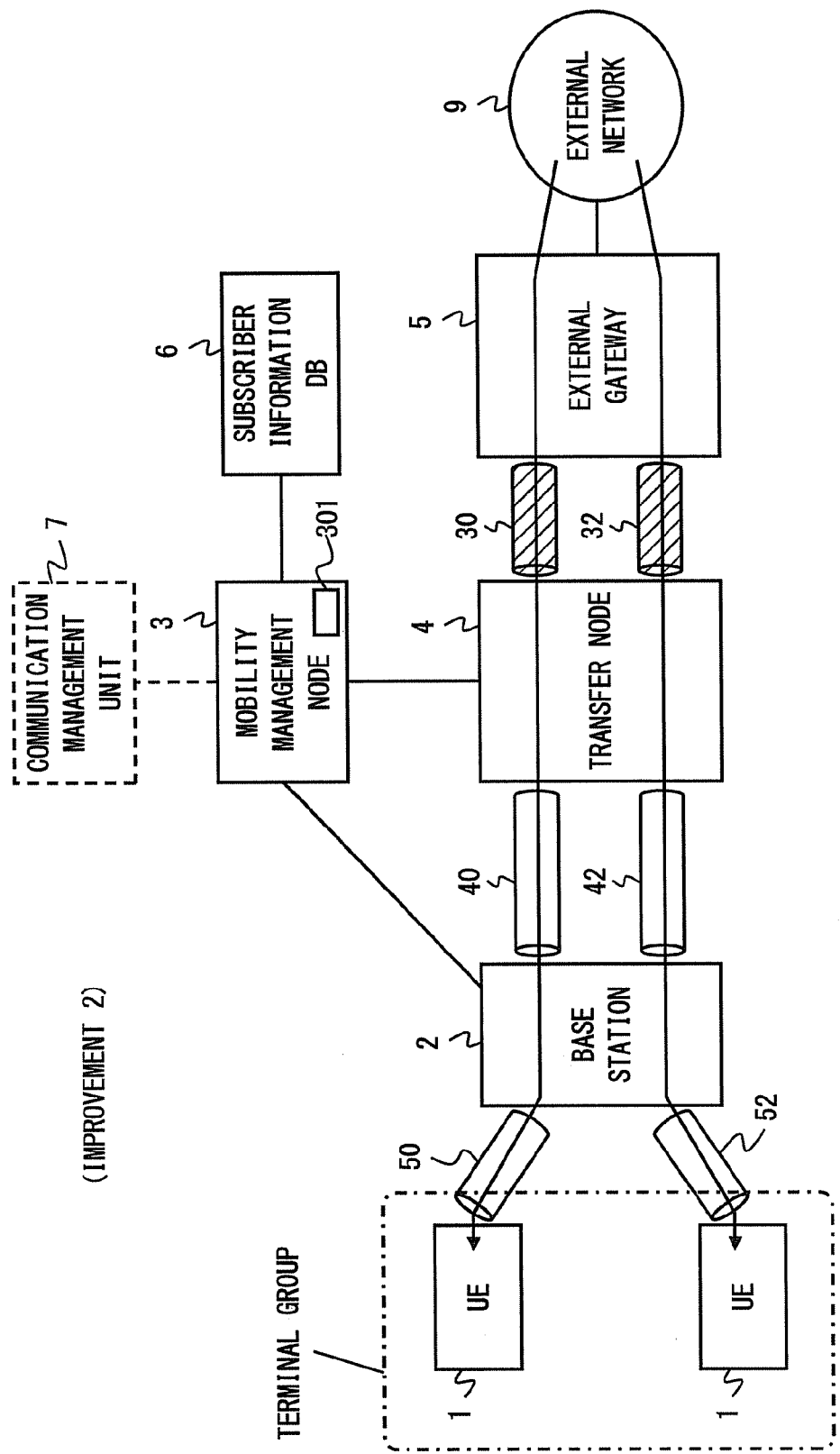
FIG. 15 is a block diagram showing a configuration example of a mobile communication system according to an exemplary embodiment (improvement 2)

FIG. 15 is a diagram showing a network and a bearer configuration when simultaneous communication is performed according to the improvement 2 explained in this exemplary embodiment. In the improvement 2, the CN 20 creates a plurality of shared CNBs between the transfer node 4 and the external gateway 5 for transferring user packets of a plurality of mobile terminals 1 which belong to the same terminal group and are connected to the same base station 2. The CN 20 provides a one-to-one mapping between each of the plurality of shared CNBs and an RAB. In FIG. 15, first and second shared CNBs 30 and 32 are created, and the first and second shared CNBs 30 and 32 are mapped to first RAB (bearer 40 and radio bearer 50) and second RAB (bearer 42 and radio bearer 52), respectively. When arbitrary two mobile terminals belonging to the same terminal group perform communication, the CN 20 uses the first shared CNB 30 for one of the two mobile terminals and the second shared CNB 32 for the other one of the two mobile terminals. Accordingly, the mobile communication system according to the improvement 2 allows simultaneous communication of mobile terminals 1 belonging to the same terminal group, whereby it is possible to suppress the occurrence of call loss.

Each of the shared CNBs 30 and 32 is used for transferring user packets of the plurality of mobile terminals 1, as described in the reference example. In the example shown in FIG. 15, two mobile terminals 1 are able to perform simultaneous communication respectively through the shared CNBs 30 and 32. When three or more mobile terminals 1 are connected to the base station 2 and two of them perform communication, for example, the mobility management node 3 allocates the shared CNBs 30 and 32 respectively to the two mobile terminals 1 and arbitrates bearer recovery requests and bearer establishment requests from third and subsequent terminals 1 so as not to allocate the shared CNBs 30 and 32 to the third and subsequent mobile terminals 1 while the two mobile terminals 1 are in communication.

In the following description, the detail of the processing procedure for achieving the improvement 2 will be described. In the improvement 2, the mobile terminal 1 which has attached to the CN 20 maintains the bearer context regarding at least two data bearers. The function that the mobile terminal 1 maintains the plurality of data bearers is already known, for example, as a multiple PDN function in the EPS. When the multiple PDN function is used, the mobile terminal 1 may maintain a plurality of PDN connections which pass through the same external gateway 5. These plurality of PDN connections may be associated with the same Access Point Name (APN) or may be associated with different APNs.

Figure 16:
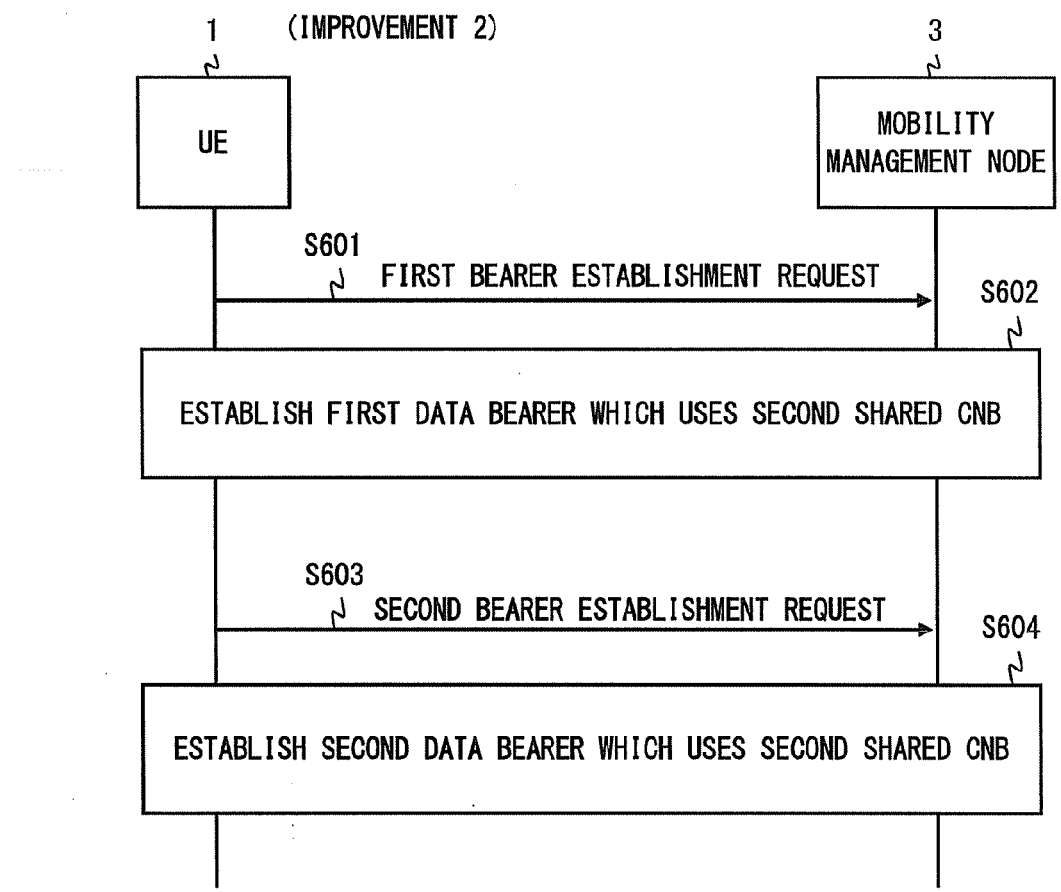
FIG. 16 is a flowchart showing one example of a bearer establishment procedure according to an exemplary embodiment (improvement 2)

FIG. 16 is a sequence diagram showing one example of the bearer establishment procedure according to the improvement 2. In Step S601, the mobile terminal 1 sends a first bearer establishment request. The first bearer establishment request triggers the CN 20 to create a first PDN connection. In Step S602, the mobility management node 3 controls the mobile terminal 1, the base station 2, the transfer node 4, and the external gateway 5 to establish the data bearer which uses the first shared CNB 30 in response to the first bearer establishment request. The processes in Step S602 may be similar to the procedure for establishing the data bearer which contains the shared CNB according to the reference example (FIGS. 4A and 4B). In Step S603, the mobile terminal 1 sends a second bearer establishment request. The second bearer establishment request triggers the CN 20 to create a second PDN connection. In Step S604, the mobility management node 3 controls the mobile terminal 1, the base station 2, the transfer node 4, and the external gateway 5 to establish the data bearer which contains the second shared CNB 32 in response to the second bearer establishment request. The first and second data bearers created in the procedure shown in FIG. 16 may be associated with different APNs or may be associated with the same APN.

FIG. 16 shows the example in which the mobile terminal 1 explicitly sends two bearer establishment requests to create a plurality of data bearers. Instead, the CN 20 according to the improvement 2 may initiate the procedure for creating a plurality of data bearers in response to one bearer establishment request transmitted from the mobile terminal 1. More specifically, the mobility management node 3 may perform control to create a plurality of PDN connections which pass through the same external gateway 5 in response to one bearer establishment request.

Figure 17:
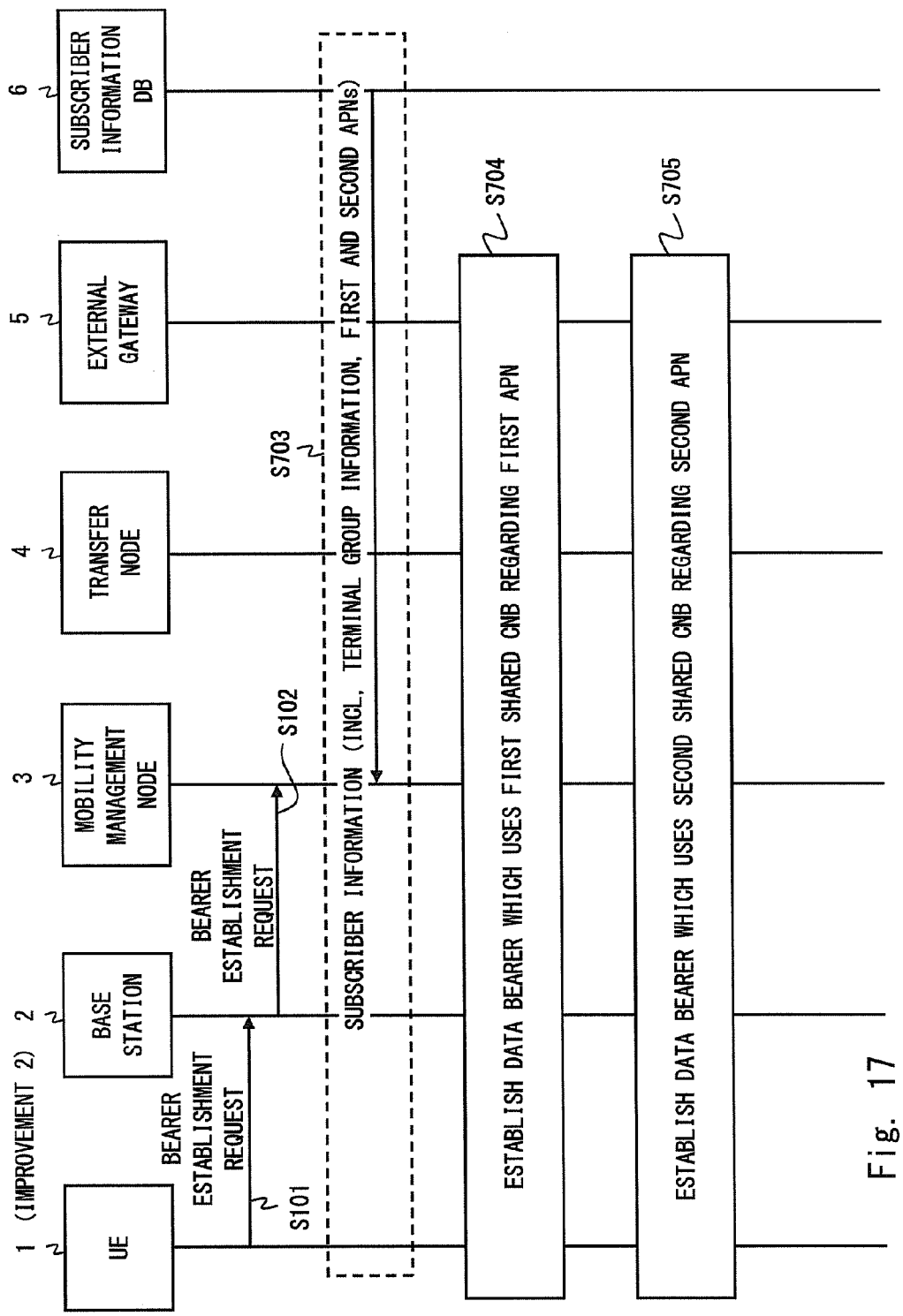
FIG. 17 is a sequence diagram showing one example of the bearer establishment procedure according to an exemplary embodiment (improvement 2)

The sequence diagram shown in FIG. 17 shows one example of the procedure for creating first and second data bearers (first and second PDN connections) associated with different APNs in response to one bearer establishment request. The processes in Steps S101 and S102 shown in FIG. 17 are similar to those in Steps S101 and S102 shown in FIG. 4A or Steps S201 and S202 shown in FIG. 5A. In Step S703, the mobility management node 3 acquires, from the subscriber information database 6, subscriber information regarding the mobile terminal 1 which has originated the bearer establishment request. In the example shown in FIG. 17, the subscriber information includes terminal group information and first and second APNs. The mobility management node 3 refers to the terminal group information and the first and second APNs, and cerates two PDN connections which are associated with the first and second APNs, respectively, and each uses a shared CNB. That is, in Step S704, the mobility management node 3 controls the mobile terminal 1, the base station 2, the transfer node 4, and the external gateway 5 to establish the data bearer which contains the first shared CNB 30 for the first APN. In Step S705, the mobility management node 3 controls the mobile terminal 1, the base station 2, the transfer node 4, and the external gateway 5 to establish the data bearer which contains the second shared CNB 32 for the second APN.

Figure 18:
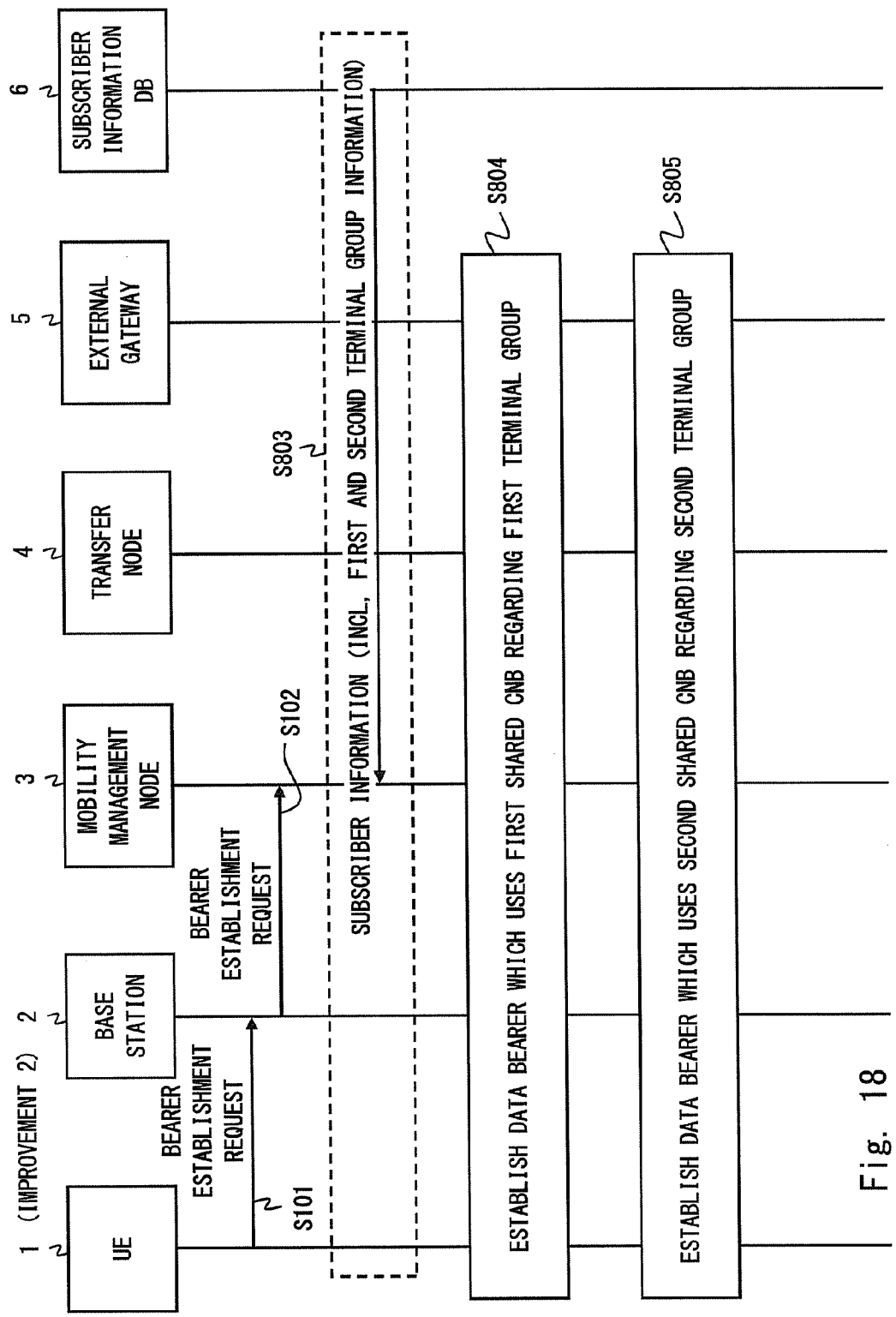
FIG. 18 is a sequence diagram showing one example of the bearer establishment procedure according to an exemplary embodiment (improvement 2)

The sequence diagram shown in FIG. 18 shows one example of the procedure for creating first and second data bearers (first and second PDN connections) associated with the same APN in response to one bearer establishment request. The processes in Steps S101 and S102 shown in FIG. 18 are similar to Steps S101 and S102 shown in FIG. 4A or Steps S201 and S202 shown in FIG. 5A. In Step S803, the mobility management node 3 acquires the subscriber information regarding the mobile terminal 1 from the subscriber information database 6. In the example shown in FIG. 18, the subscriber information includes first and second terminal group information. That is, the subscriber information indicates that the mobile terminal 1 belongs to a plurality of terminal groups. The mobility management node 3 refers to the first and second terminal group information, and creates first and second PDN connections which are associated with the first and second terminal groups, respectively, and each uses a shared CNB. That is, in Step S804, the mobility management node 3 controls the mobile terminal 1, the base station 2, the transfer node 4, and the external gateway 5 to establish the data bearer which contains the first shared CNB 30 for the first terminal group. In Step S805, the mobility management node 3 controls the mobile terminal 1, the base station 2, the transfer node 4, and the external gateway 5 to establish the data bearer which contains the second shared CNB 32 for the second terminal group.

FIG. 19 shows one example of the bearer management table of the external gateway 5 according to the improvement 2. The external gateway 5 creates a plurality of shared CNBs 30 and 32 for one mobile terminal 1 in response to the request from the mobility management node 3 received through the transfer node 4. That is, the external gateway 5 adds an entry regarding the two shared CNBs 30 and 32 into the bearer management table. As will be understood from the comparison between FIG. 19 and FIG. 2, the management table shown in FIG. 19 includes a third entry regarding the second shared CNB 32. In the third entry shown in FIG. 19, the subnet number "2001:DB8:3::/60" as the IPv6 address range is associated with the second shared CNB 32 specified by the IPv4 address "10.0.0.1" of the transfer node 4 and the CNB identifier "00003".

FIG. 20 shows one example of the bearer management table of the transfer node 4 according to the improvement 2. As will be understood from the comparison between FIG. 20 and FIG. 3, a third entry indicating the mapping between the second shared CNB 32 and the bearer 42 is added in FIG. 20. In the example shown in FIG. 20, the bearer 42 is specified by the IP address "10.0.1.1" of the base station 2 and the RAB identifier "00002".

Figure 21:
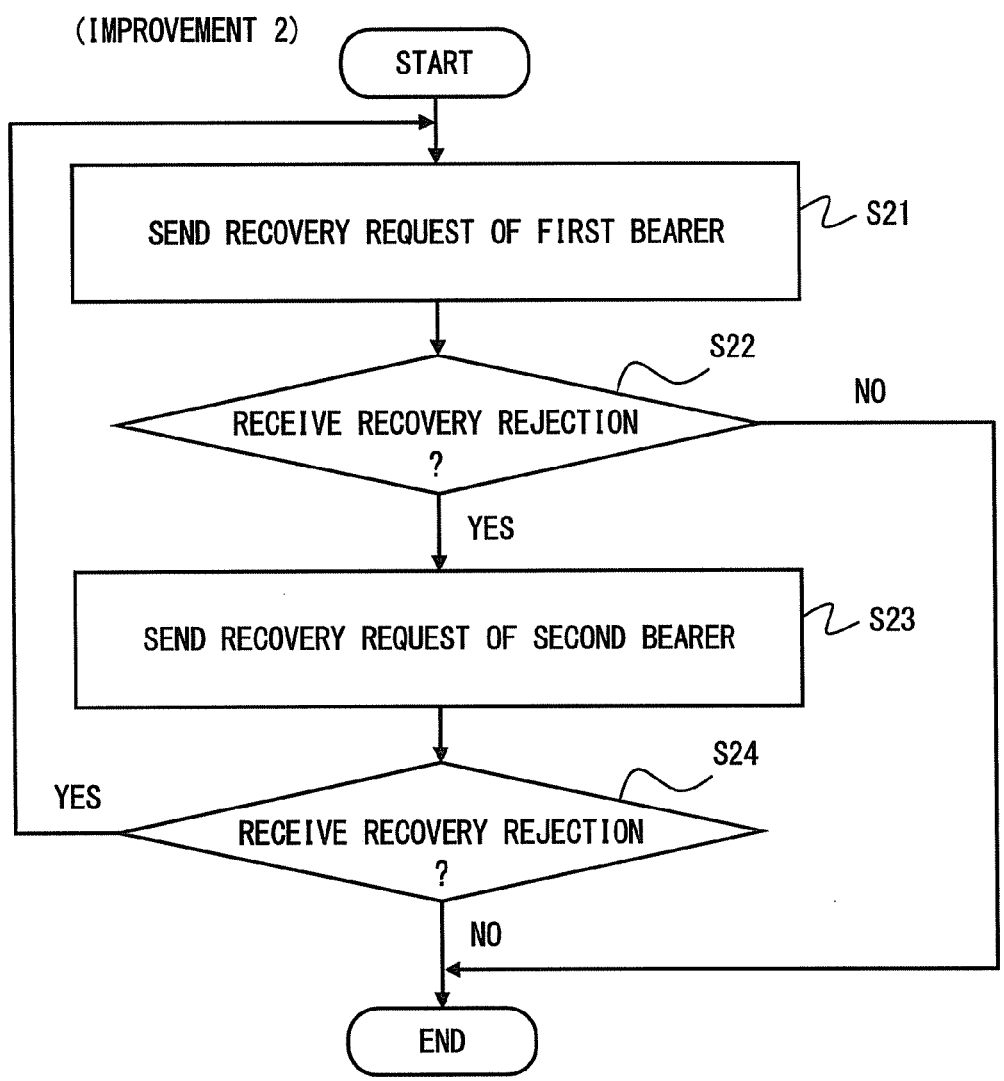
FIG. 21 is a flowchart showing an operation example when a mobile terminal according to an exemplary embodiment starts communication (improvement 2)

FIG. 21 is a flowchart showing an operation example when the mobile terminal 1 according to the improvement 2 starts communication. FIG. 21 shows an operation in which the mobile terminal 1 which has already attached to the CN 20 and is in the IDLE state sends a service recovery request. In Step S21, the mobile terminal 1 sends a bearer recovery request regarding the first data bearer which contains the shared CNB 30. In Step S21, the mobile terminal 1 determines whether the recovery request of the first data bearer has been rejected by the mobility management node 3. When the recovery of the first data bearer is allowed (No in Step S22), the mobile terminal 1 performs communication using the first data bearer. On the other hand, when the recovery of the first data bearer is rejected (YES in Step S22), the mobile terminal 1 sends a bearer recovery request regarding the second data bearer which contains the shared CNB 32 (Step S23). In Step S22, the mobile terminal 1 determines whether the recovery request of the second data bearer has been rejected by the mobility management node 3. When the recovery of the first data bearer is allowed (NO in Step S24), the mobile terminal 1 performs communication using the second data bearer. On the other hand, when the recovery of the second data bearer is rejected as well (YES in Step S24), the mobile terminal 1 goes back to Step S21 to repeat processing. The mobility management node 3 may send a backoff notification, which requests the mobile terminal 1 to backoff the transmission of the next bearer establishment request (or bearer recovery request), together with the bearer recovery rejection message.

Third Exemplary Embodiment

Described in this exemplary embodiment is architecture and methods according to the improvement 3 capable of suppressing the occurrence of call loss when the shared CNB 30 is used for transferring user packets of the plurality of mobile terminals 1.

Improvement 3

Figure 22:
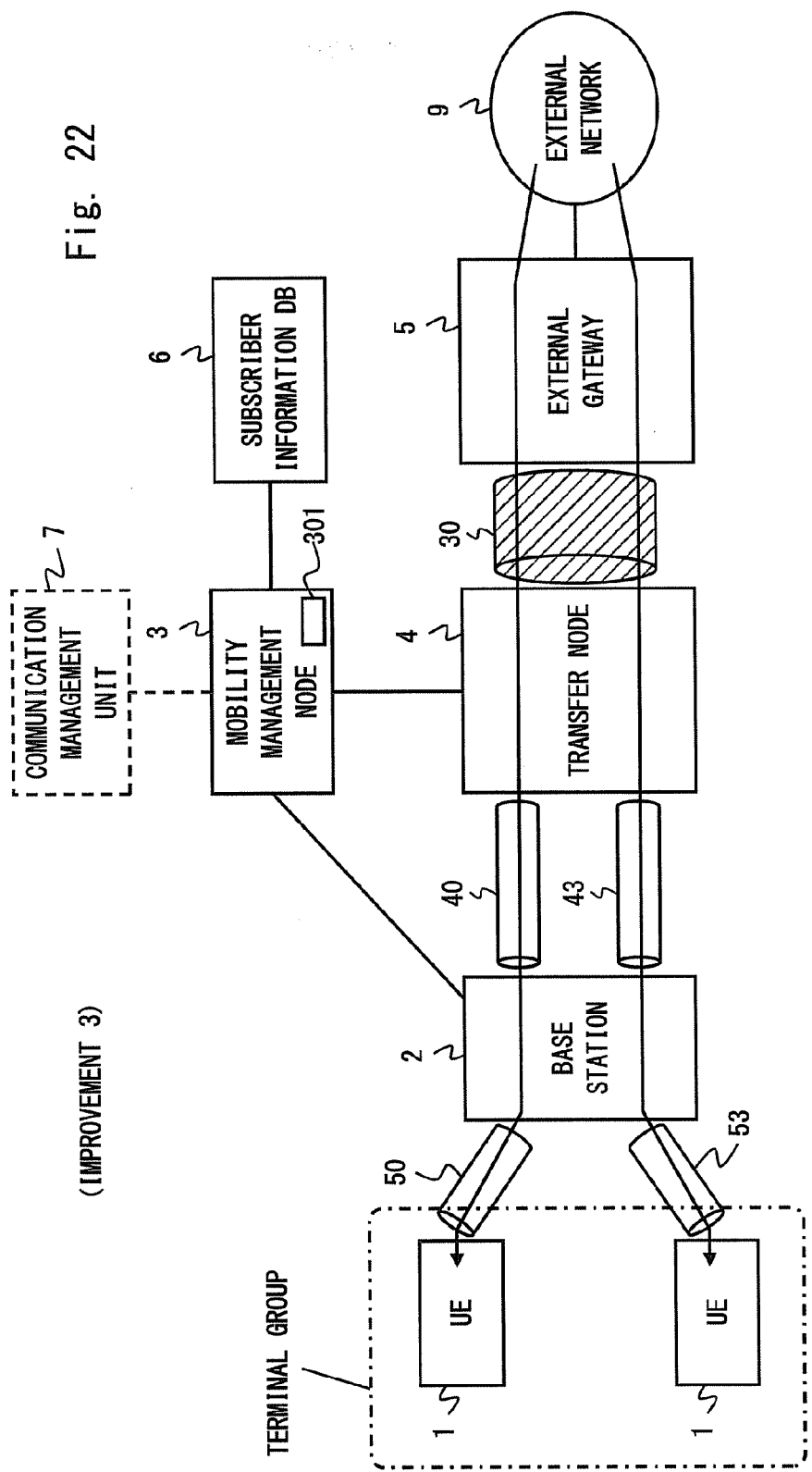
FIG. 22 is a block diagram showing a configuration example of a mobile communication system according to an exemplary embodiment (improvement 3)

FIG. 22 is a diagram showing a network and a bearer configuration when simultaneous communication is performed according to the improvement 3. When the timings of communication of two or more mobile terminals 1 which belong to the same terminal group and are connected to the same base station 2 do not overlap, the operation of the mobile communication system according to the improvement 3 is similar to that in the reference example. That is, the mobile communication system according to the improvement 3 is able to perform data packet transfer only using the first RAB (bearer 40 and radio bearer 50) and the shared CNB 30 unless the timings of communication of two or more mobile terminals 1 overlap with each other. In this case, not only the endpoint configuration of the shared CNB 30 managed by the external gateway 5 and the transfer node 4, the endpoint configuration of the bearer 40 managed by the transfer node 4 is also commonly used for transferring user packets of the plurality of mobile terminals 1. Accordingly, the number of bearer contexts that should be managed by the transfer node 4 and the external gateway 5 can be reduced, and the process load required to maintain the bearers can be reduced.

On the other hand, when the timings of communication of two or more mobile terminals 1 overlap with each other, the CN 20 according to the improvement 3 creates an additional second RAB (bearer 43 and radio bearer 53) for each of the second and subsequent mobile terminals 1, and maps, in addition to the first RAB (bearer 40 and radio bearer 50), the second RAB to the shared CNB 30. This mapping may be performed by modifying the bearer mapping table of the transfer node 4. The CN 20 according to the improvement 3 uses the first RAB (bearer 40 and radio bearer 50) and the shared CNB 30 for the first mobile terminal 1, and uses the second RAB (bearer 43 and radio bearer 53) and the shared CNB 30 for the second mobile terminal 1. Specifically, the transfer node 4 refers to the destination address of user packets received through the shared CNB 30, assigns user packets destined for the first mobile terminal 1 to the first RAB (i.e., bearer 40), and assigns user packets destined for the second mobile terminal 1 to the second RAB (i.e., bearer 43). In summary, when the timings of communication of two or more mobile terminals 1 incidentally overlap with each other, the mobile communication system according to the improvement 3 temporarily creates an additional RAB and executes packet forwarding processing on a per user packet basis in the transfer node 4. Accordingly, the mobile communication system according to the improvement 3 is able to suppress the increase in the process load required to maintain the bearers in the transfer node 4 and the external gateway 5 while suppressing the occurrence of call loss.

Further, in the architecture and the methods according to the improvement 3, change of configuration of the shared CNB 30, addition of a CNB, and change of the packet filter (TFT) in the external gateway 5 are not required when two or more mobile terminals 1 belonging to the same terminal group are simultaneously communicating. This is because the transfer node 4 adds the second RAB and performs packet-forwarding processing on a per user packet basis to address the simultaneous communication. Accordingly, the architecture and the methods according to the improvement 3 are able to suppress the increase in the CNB context that should be managed by the external gateway 5 and to reduce the process load of the external gateway 5 when two or more mobile terminals 1 perform simultaneous communication.

The CN 20 according to the improvement 3 may release the configuration of the second RAB (bearer 43 and radio bearer 53) in the CN 20 (e.g., the bearer context held by the transfer node 4 and the mobility management node 3) in response to the completion of the communication of each of the second and subsequent mobile terminal 1. More specifically, although the bearer context is maintained in the CN 20 in the normal preservation function, the CN 20 according to the improvement 3 may release the configuration in the CN 20 regarding the second RAB when each of the second and subsequent mobile terminals 1 ends the communication and transitions to the IDLE state. Meanwhile, the context regarding the shared CNB 30 is maintained in the CN 20. In the next communication of the mobile terminal 1 which has made a transition to the IDLE state, if there are no other terminals that are in communication, the first RAB (bearer 40 and radio bearer 50) and the shared CNB 30 are used.

Figure 23:
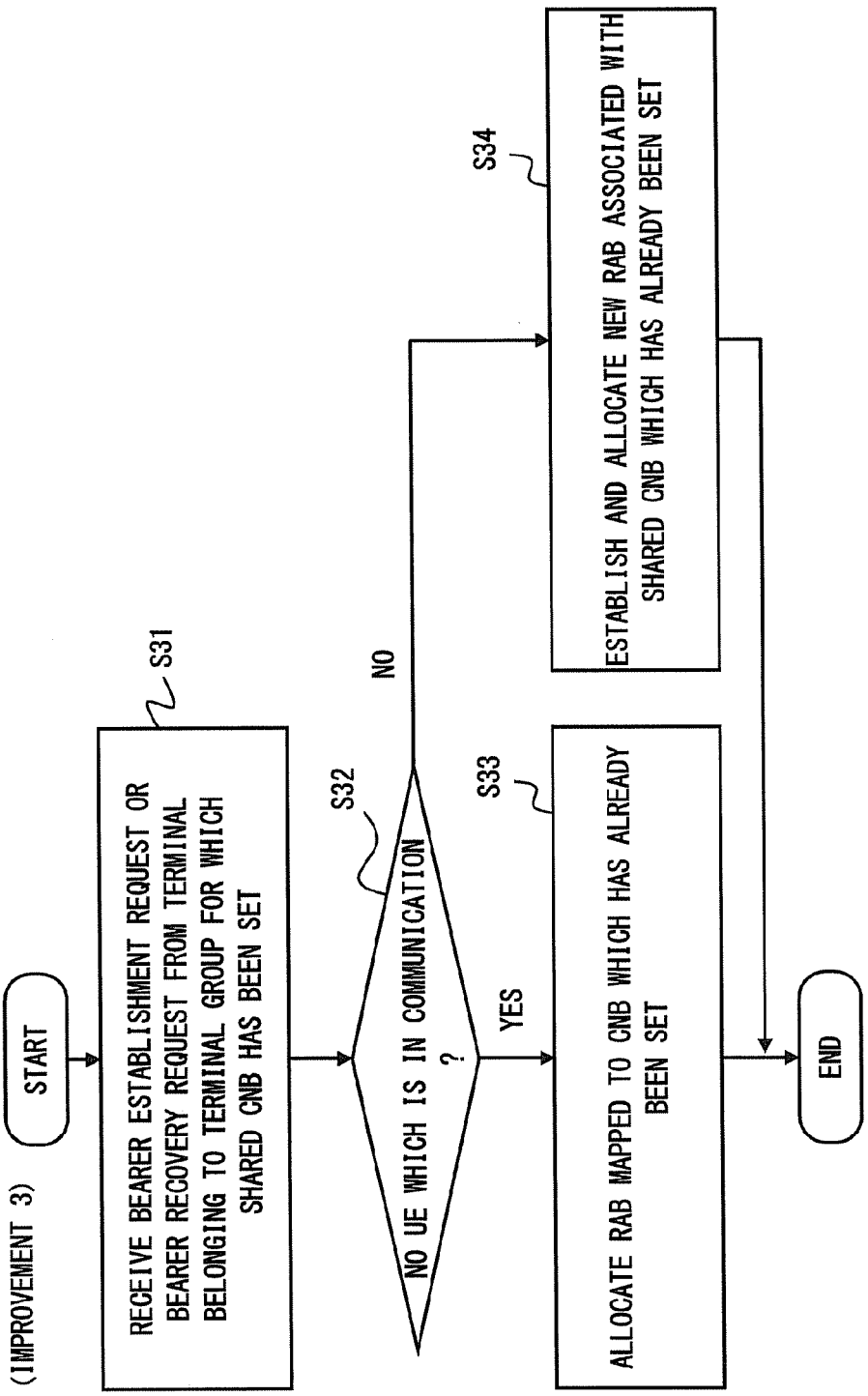
FIG. 23 is a flowchart showing one example of a bearer establishment procedure according to an exemplary embodiment (improvement 3)

Next, in the following description, the detail of a processing procedure for achieving the improvement 3 will be described. FIG. 23 is a flowchart showing an operation example of the mobility management node according to the improvement 3. The processes in Steps S31 to S33 are similar to Steps S11 to S13 regarding the improvement 1 shown in FIG. 10, and thus the description will be omitted. When it is determined that another mobile terminal (UE) 1 belonging to the same terminal group, to which the mobile terminal that has originated the bearer recovery request belongs, and being connected to the same base station 2 is in communication (NO in Step S32), the mobility management node 3 (controller 301) controls the mobile terminal 1, the base station 2, the transfer node 4, and the external gateway 5 to execute a bearer establishment procedure to newly create the second RAB (bearer 43 and radio bearer 53), and to allocate the additional data bearer to the mobile terminal 1 (Step S34).

FIG. 24 shows one example of the bearer management table of the external gateway 5 according to the improvement 3. The bearer management table shown in FIG. 24 is the same as the bearer management table according to the reference example shown in FIG. 2. In the improvement 3, only the second RAB (bearer 43 and radio bearer 53) is additionally created when two mobile terminals 1 are simultaneously communicating, and there is no need to add a CNB. It is therefore not required to update the bearer management table of the external gateway 5.

FIG. 25 shows one example of the bearer management table of the transfer node 4 according to the improvement 3. In the mapping table shown in FIG. 25, the column showing terminal IP addresses or terminal group IP address ranges is added to differentiate the user packet flows (also called a Service Data Flows (SDFs)) which flow through the shared CNB 30. In the example shown in FIG. 25, each user packet flow is specified by the terminal IP address (or the terminal group IP address range), the IP address of the external gateway 5, and the CNB identifier. Further, in the example shown in FIG. 25, a third entry indicating the mapping between the packet flow regarding the second mobile terminal 1 and the second RAB (bearer 43 and radio bearer 53) is added. Specifically, the user packet flow specified by the IPv6 address "2001:DB8:1:1::164" of the second mobile terminal 1, the IPv4 address "10.0.0.1" of the external gateway 5, and the CNB identifier "00001" is mapped to the second RAB (bearer 42) specified by the IPv4 address "10.0.1.1" of the base station 2 and the RAB identifier "0002".

The transfer node 4 may determine the RAB to which the user packets are sent by performing longest matching using the management table shown in FIG. 25. Accordingly, the transfer node 4 is able to send the user packets of the second mobile terminal 1, to which the IPv6 address "2001:DB8: 1:1::/64" is allocated, to the second RAB (bearer 43 and radio bearer 53), not to the first RAB (bearer 40 and radio bearer 50).

Figure 26A:
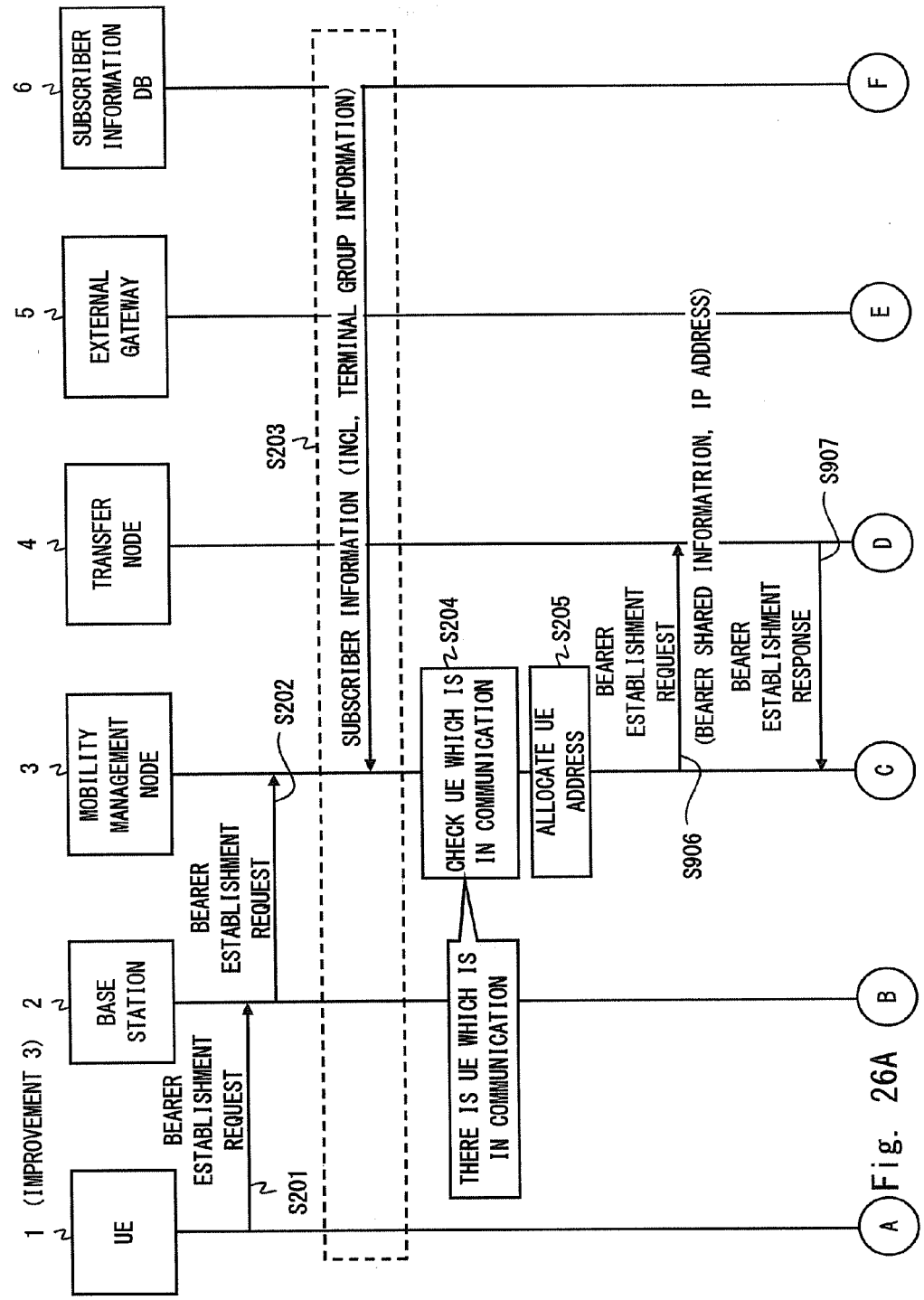
FIG. 26A is a sequence diagram showing one example of a bearer establishment procedure according to an exemplary embodiment (improvement 3)
Figure 26B:
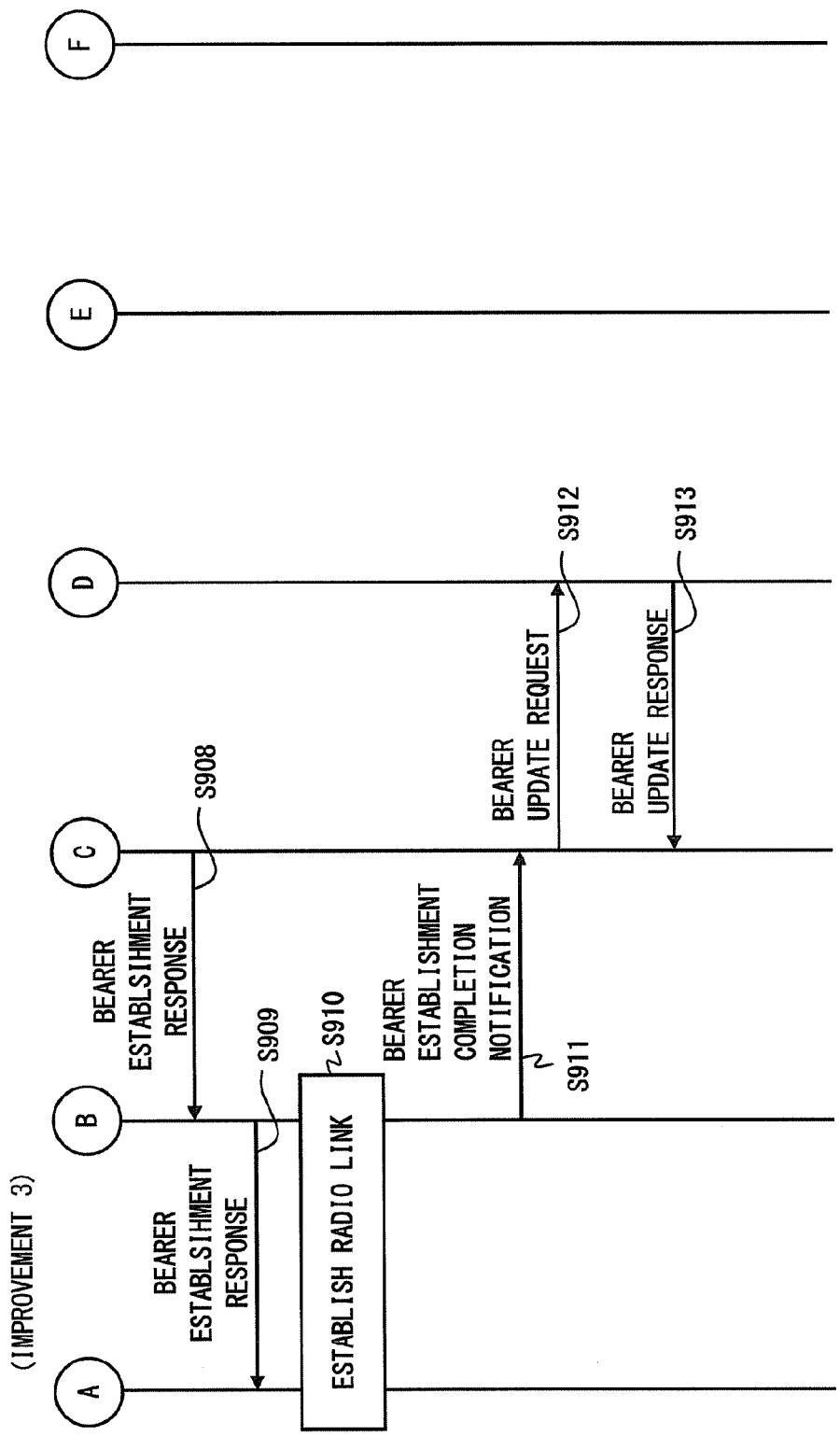
FIG. 26B is a sequence diagram showing one example of the bearer establishment procedure according to an exemplary embodiment (improvement 3)

In the following description, specific examples of a procedure for establishing the second RAB according to the improvement 3 will be described. The sequence diagrams shown in FIGS. 26A and 26B show an example of creating the second RAB in response to the bearer establishment request from the second or subsequent mobile terminal 1. The processes in Steps S201 to S205 shown in FIG. 26A are similar to Steps S201 to S205 shown in FIG. 5A or FIG. 6. In Step S204 shown in FIG. 26A, the mobility management node 3 determines that there is a mobile terminal 1 which is currently in communication regarding the terminal group to which the mobile terminal 1 that has originated the bearer establishment request belongs. After that, in the reference example shown in FIG. 6, the mobility management node 3 rejects the bearer establishment. Meanwhile, in the improvement 3 shown in FIG. 26A, the mobility management node 3 sends a bearer establishment request to the transfer node 4 to create an additional second RAB (bearer 43 and radio bearer 53) (Step S906). The bearer establishment request in Step S906 triggers the transfer node 4 to additionally create the bearer 43 and to create a mapping between the bearer 43 and the user packet flow regarding the second mobile terminal. Accordingly, the bearer establishment request in Step S906 may include the IP address allocated to the second mobile terminal 1, and the bearer sharing information. The bearer sharing information here may be, for example, an identifier of the shared CNB 30.

In Step S907, the transfer node 4 adds an entry regarding the second RAB (bearer 43 and radio bearer 53) into the bearer management table in response to the reception of the bearer establishment request, and creates a mapping between the second RAB and the packet flow of the second mobile terminal 1 transferred through the shared CNB 30. The transfer node 4 then returns the bearer establishment response to the mobility management node 3. The following processes in Steps S908 to S913 may be similar to the procedure for establishing the normal data bearer (e.g., procedure disclosed in the section 5.3.1 "Attach procedure" of Non-patent literature 1).

Figure 27A:
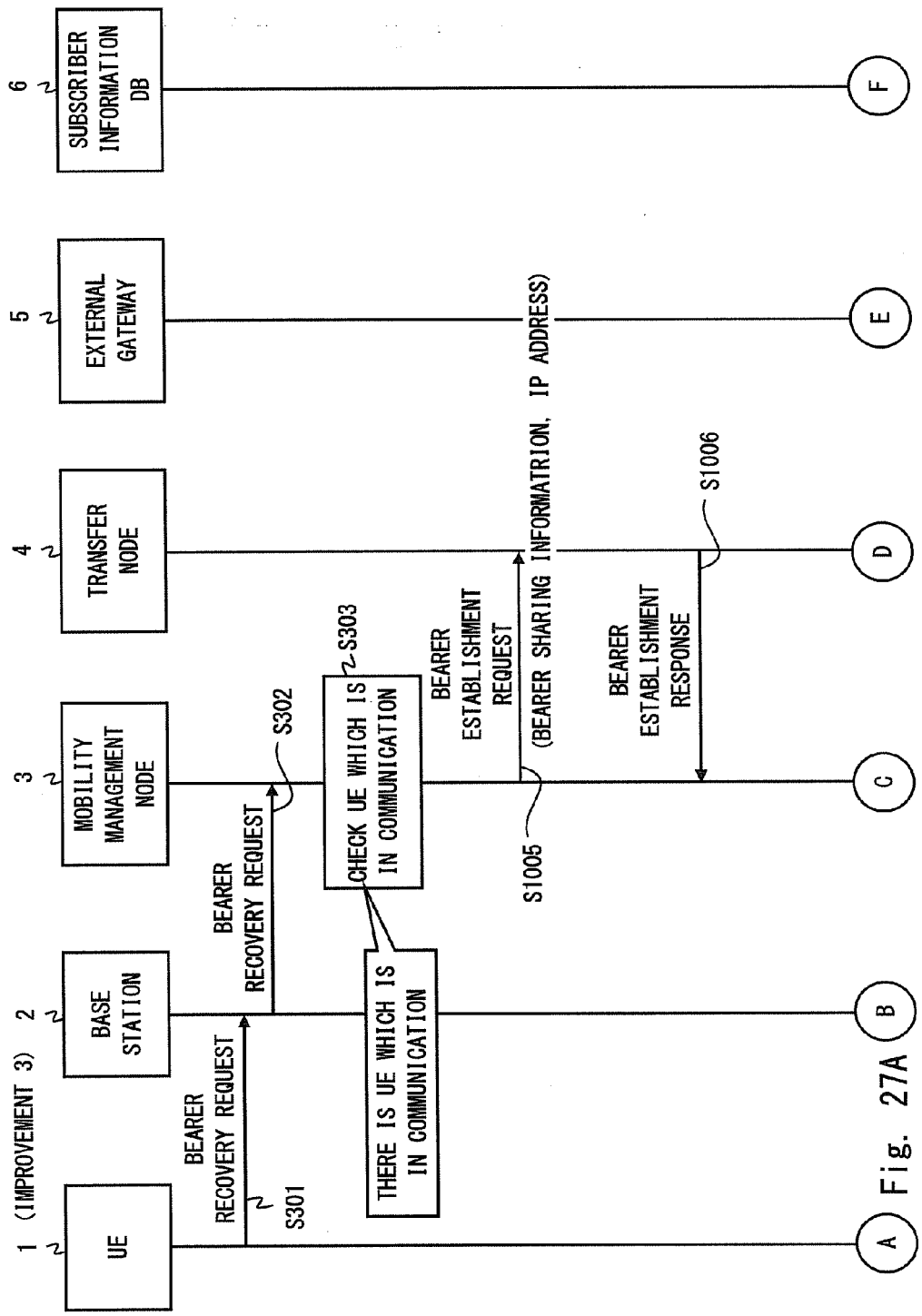
FIG. 27A is a sequence diagram showing one example of a bearer recovery procedure according to an exemplary embodiment (improvement 3).
Figure 27B:
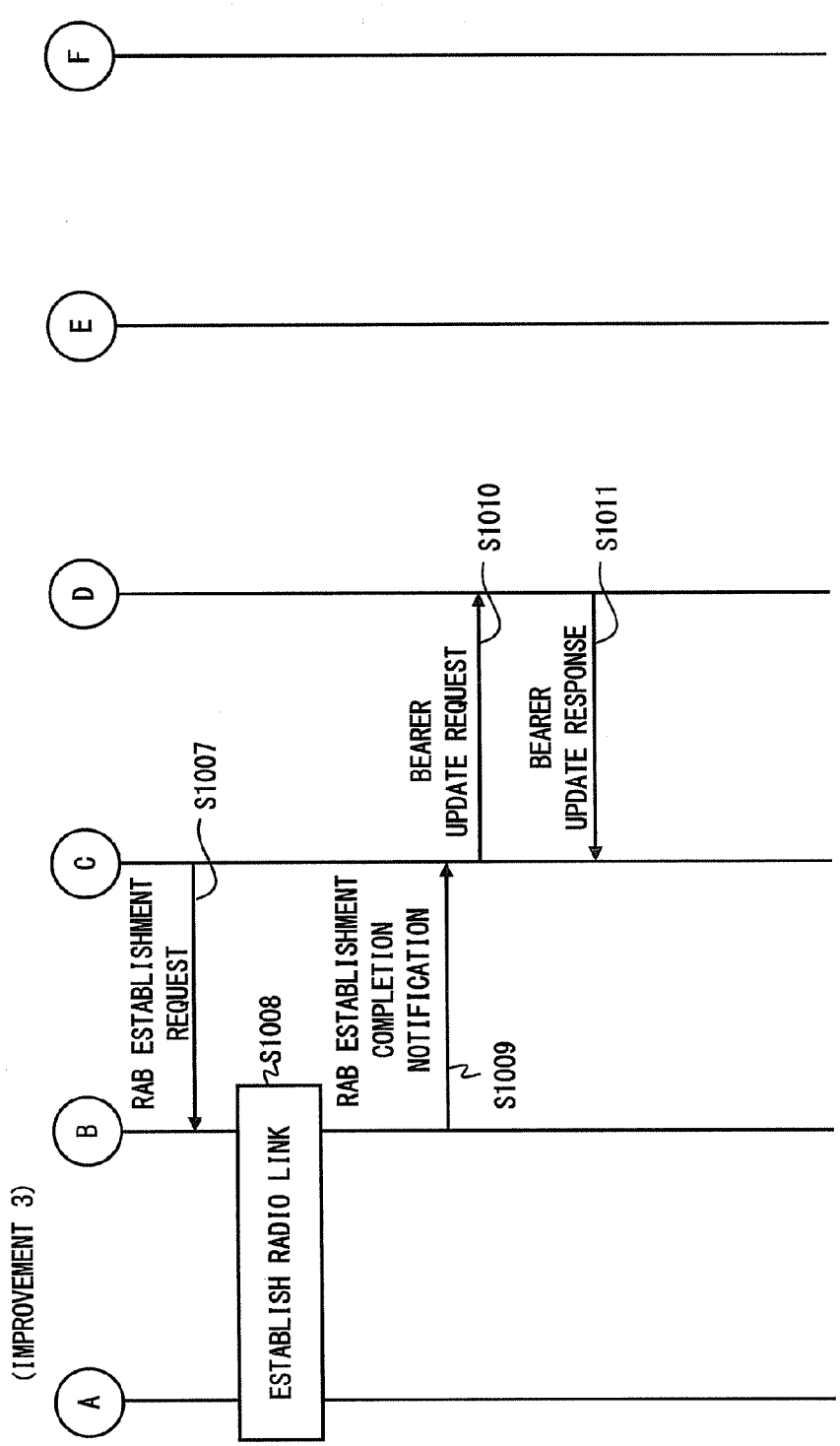
FIG. 27B is a sequence diagram showing one example of a bearer recovery procedure according to an exemplary embodiment (improvement 3).

Next, with reference to FIGS. 27A and 27B, specific examples of the bearer recovery procedure according to the improvement 3 will be described. The processes in Steps S301 to S303 in FIG. 27A are similar to Steps S301 to S303 in FIG. 8 according to the reference example. In Step S303 in FIG. 27A, the mobility management node 3 determines that another mobile terminal being connected to the same base station 2 and belonging to the same terminal group as the mobile terminal 1 which has originated the bearer recovery request is in communication. After that, in the reference example shown in FIG. 8, the mobility management node 3 rejects a bearer recovery. Meanwhile, in the improvement 3 shown in FIGS. 27A and 27B, the mobility management node 3 sends a bearer establishment request to the transfer node 4 (Step S1005). The bearer establishment request in Step S1005 performs a similar role as the bearer establishment request in Step S906 shown in FIG. 26 stated above. The bearer establishment request in Step S1005 may include the IP address allocated to the second mobile terminal 1 and the bearer sharing information. The bearer sharing information here may be, for example, an identifier of the shared CNB 30.

In Step S1006, the transfer node 4 adds an entry regarding the second RAB (bearer 43 and radio bearer 53) into the bearer management table in response to the reception of the bearer establishment request, and creates a mapping between the second RAB and the packet flow of the second mobile terminal 1 transferred through the shared CNB 30. The transfer node 4 then returns the bearer establishment response to the mobility management node 3. The following processes in Steps S1007 to S1011 may be similar to the normal bearer recovery procedure (e.g., procedure disclosed in the section 5.3.4 "Service Request procedure" of Non-patent literature 1).

Fourth Exemplary Embodiment

Improvement 4

Described in this exemplary embodiment is another improvement of the architecture according to the reference example which uses the shared CNB 30 for user packet transfer of the plurality of mobile terminals 1. The configuration example of the mobile communication system according to this exemplary embodiment may be similar to the configuration example shown in FIG. 1. When an arbitrary one of mobile terminals which belong to the same terminal group and are connected to the same base station 2 ends communication and transitions from the CONNECTED state to the IDLE state, the CN 20 (e.g., mobility management node 3) according to this exemplary embodiment sends, to the arbitrary one mobile terminal, a backoff notification to temporarily suppress the next communication. The operation of the mobile terminal 1 which has received the notification may be similar to the operation of the mobile terminal 1 when receiving the backoff notification transmitted from the CN 20 to the mobile terminal 1 when the CN 20 rejects the bearer establishment request or the bearer recovery request. The mobile terminal 1 suppresses, for example, the transmission of the next bearer recovery request or the bearer establishment request for a predetermined period of time, for the time randomly determined, or for the time period specified in the backoff notification.

The "IDLE state" means a state in which the mobile terminal 1 does not continuously exchange control signals for the bearer management and the mobility management with the CN 20 and radio resources in the RAN 10 are released. One example of the IDLE state is an EPS Connection Management IDLE (ECM-IDLE) state and a Radio Resource Control IDLE (RRC_IDLE) state of the 3GPP. In the RRC_IDLE, radio resources in the E-UTRAN are released. Meanwhile, the "CONNECTED state" means a state in which, like the ECM-CONNECTED state and the RRC_CONNECTED state of the 3GPP, the radio resources to transmit or receive control signals (control messages) for the bearer management and the mobility management at least between the mobile terminal 1 and the CN 20 are secured in the RAN 10 and a connection which allows transmission and reception of control signals (control messages) between the mobile terminal 1 and the CN 20 is established.

According to this exemplary embodiment, the CN 20 is able to control the initiation timing of the next communication of the mobile terminal 1 when the mobile terminal 1 normally ends the communication. It is therefore easy to perform an arbitration in advance so as to prevent the occurrence of simultaneous communication of the mobile terminals 1, whereby it is possible to reduce the occurrence of call loss in the architecture of the reference example in which simultaneous communication cannot be performed.

Fifth Exemplary Embodiment

Improvement 5

In this exemplary embodiment, another improvement of the architecture according to the reference example which uses the shared CNB 30 for user packet transfer of the plurality of mobile terminals 1 will be described. The configuration example of the mobile communication system according to this exemplary embodiment may be similar to the configuration example shown in FIG. 1. The CN 20 (e.g., mobility management node 3) according to the exemplary embodiment determines the mobile terminal 1 to be included in the terminal group based on the communication characteristics of the plurality of mobile terminals 1 connected to the base station 2. In other words, the CN 20 according to the exemplary embodiment dynamically executes grouping of the mobile terminals 1 in consideration of the communication characteristics of the mobile terminals 1. As the communication characteristics of the mobile terminal 1, for example, a frequency of communication, a communication interval, duration of communication, or a tolerance level of a communication delay, or any combination thereof may be taken into account.

As one example, the CN 20 may form one terminal group by the aggregation of a plurality of mobile terminals 1 in which the frequency of communication is lower than a predetermined reference. If the frequency of communication is low, the possibility that the plurality of mobile terminals 1 simultaneously perform communication is low. It is therefore possible to form the terminal group suitable for the architecture according to the reference example in which simultaneous communication is prohibited. Based on the similar idea, the CN 20 may form one terminal group by the aggregation of a plurality of mobile terminals 1 in which the communication interval is longer than a predetermined reference. Otherwise, the CN 20 may form one terminal group by the aggregation of a plurality of mobile terminals 1 in which the duration of communication is shorter than a predetermined reference.

As another example, the CN 20 may include a first mobile terminal and a second mobile terminal having different levels for tolerating the communication delay as one terminal group. Consider a case in which the first mobile terminal does not tolerate the communication delay compared to the second mobile terminal. In this case, in response to the reception of the communication request (bearer establishment request or bearer recovery request) from the first mobile terminal while the second mobile terminal performs communication using the shared CNB 30, the CN 20 may end the communication of the second mobile terminal and allocate the shared CNB 30 to the first mobile terminal. It is therefore possible to preferentially suppress the call loss of the first mobile terminal, which does not tolerate the communication delay.

Other Exemplary Embodiments

The first to fifth exemplary embodiments may be implemented in combination with one another as needed.

The reference example described in the first to fifth exemplary embodiments, and the processes and the operations of the mobile terminal 1, the base station 2, the mobility management node 3, the transfer node 4, and the external gateway 5 in the improvements 1 to 5 may be implemented by causing a computer system including at least one processor to execute a program. Specifically, the computer system may be supplied with one or a plurality of programs including instructions to cause the computer system to perform the algorithm regarding the operations of the bearer control and the like described with reference to the sequence diagrams and flowcharts.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, the above first to fifth exemplary embodiments have been mainly described using specific examples regarding the EPS and the UMTS. However, the mobile communication system according to the first to fifth exemplary embodiments may be another mobile communication system.

Further, the above exemplary embodiments are merely examples regarding the application of technical ideas obtained by the present inventors. In summary, needless to say, the technical ideas are not limited to the exemplary embodiments stated above and may be changed in various ways.

The technical ideas shown in the above exemplary embodiments can be stated as shown, for example, in the following Supplementary notes.

(Supplementary Note A1)

A mobile communication system including:

a radio access network including a base station; and a core network including an external gateway and a transfer node, in which:

the core network creates a shared core network bearer, CNB, between the transfer node and the external gateway, the shared CNB is shared for transferring user packets of a plurality of mobile terminals connected to the base station, the core network provides a one-to-one mapping between the shared CNB and a first radio access bearer, RAB, in the transfer node, the core network uses the shared CNB and the first RAB for an arbitrary one of the plurality of mobile terminals when the arbitrary one of the plurality of mobile terminals performs communication, and when a first mobile terminal and a second mobile terminal of the plurality of mobile terminals simultaneously perform communication, the core network uses the shared CNB and the first RAB for the first mobile terminal and additionally creates and uses a second CNB and a second RAB for the second mobile terminal.

(Supplementary Note A2)

The mobile communication system according to Supplementary note A1, in which, in response to a completion of communication of the second mobile terminal, the core network releases configurations in the core network of the second RAB and the second CNB.

(Supplementary Note A3)

The mobile communication system according to Supplementary note A1 or A2, in which the external gateway sets a packet filter to map user packets, destined for an address within an IP address range allocated to the plurality of mobile terminals, to the shared CNB, and the external gateway modifies the packet filter to map user packets, destined for an address allocated to the second mobile terminal, to the second CNB when the first mobile terminal and the second mobile terminal simultaneously perform communication.

(Supplementary Note A4)

The mobile communication system according to any one of Supplementary notes A1 to A3, in which in response to receiving a bearer recovery request from the second mobile terminal while the first mobile terminal is already performing communication, the core network rejects the bearer recovery request and requests the second mobile terminal to detach, and the core network creates the second CNB and the second RAB in response to a bearer establishment request transmitted from the second mobile terminal after the second mobile terminal has detached.

(Supplementary Note A5)

The mobile communication system according to any one of Supplementary notes A1 to A3, in which the core network creates the second CNB and the second RAB in response to receiving a bearer recovery request from the second mobile terminal while the first mobile terminal is already performing communication.

(Supplementary Note A6)

The mobile communication system according to any one of Supplementary notes A1 to A5, in which an endpoint configuration of the first RAB is commonly used for transferring user packets of the plurality of mobile terminals.

(Supplementary Note A7)

A control apparatus, arranged in a core network, including:

a controller that performs bearer control, in which the controller controls the core network to create a shared core network bearer, CNB, between a transfer node and an external gateway, the shared CNB is shared for transferring user packets of a plurality of mobile terminals connected to a base station, the controller controls the core network to provide a one-to-one mapping between the shared CNB and a first radio access bearer, RAB, in the transfer node, the controller controls the core network and the base station to use the shared CNB and the first RAB for an arbitrary one of the plurality of mobile terminals when the arbitrary one of the plurality of mobile terminals performs communication, and when a first mobile terminal and a second mobile terminal of the plurality of mobile terminals simultaneously perform communication, the controller controls the core network and the base station to use the shared CNB and the first RAB for the first mobile terminal and to additionally create and use a second CNB and a second RAB for the second mobile terminal.

(Supplementary Note A8)

The control apparatus according to Supplementary note A7, in which, in response to a completion of communication of the second mobile terminal, the controller controls the core network to release configurations in the core network of the second RAB and the second CNB.

(Supplementary Note A9)

The control apparatus according to Supplementary note A7 or A8, in which:

the controller performs control to set, in the external gateway, a packet filter to map user packets, destined for an address within an IP address range allocated to the plurality of mobile terminals, to the shared CNB, and the controller performs control to modify the packet filter to map user packets, destined for an address allocated to the second mobile terminal, to the second CNB when the first mobile terminal and the second mobile terminal simultaneously perform communication.

(Supplementary Note A10)

The control apparatus according to any one of Supplementary notes A7 to A9, in which:

in response to receiving a bearer recovery request from the second mobile terminal while the first mobile terminal is already performing communication, the controller rejects the bearer recovery request and requests the second mobile terminal to detach, and the controller creates the second CNB and the second RAB in response to a bearer establishment request transmitted from the second mobile terminal after the second mobile terminal has detached.

(Supplementary Note A11)

The control apparatus according to any one of Supplementary notes A7 to A9, in which the controller creates the second CNB and the second RAB in response to receiving a bearer recovery request from the second mobile terminal while the first mobile terminal is already performing communication.

(Supplementary Note A12)

The control apparatus according to any one of Supplementary notes A7 to A11, in which an endpoint configuration of the first RAB is commonly used for transferring user packets of the plurality of mobile terminals.

(Supplementary Note A13)

A communication control method including:

controlling a core network to create a shared core network bearer, CNB, between a transfer node and an external gateway, the shared CNB being shared for transferring user packets of a plurality of mobile terminals connected to a base station;

controlling the core network to provide a one-to-one mapping between the shared CNB and a first radio access bearer, RAB, in the transfer node;

controlling, when an arbitrary one of the plurality of mobile terminals performs communication, the core network and the base station to use the shared CNB and the first RAB for the arbitrary one of the plurality of mobile terminals; and when a first mobile terminal and a second mobile terminal of the plurality of mobile terminals simultaneously perform communication, controlling the core network and the base station to use the shared CNB and the first RAB for the first mobile terminal and to additionally create and use a second CNB and a second RAB for the second mobile terminal.

(Supplementary Note A14)

A program that causes a computer to execute a communication control method, the communication control method including:

controlling a core network to create a shared core network bearer, CNB, between a transfer node and an external gateway, the shared CNB being shared for transferring user packets of a plurality of mobile terminals connected to a base station;

controlling the core network to provide a one-to-one mapping between the shared CNB and a first radio access bearer, RAB, in the transfer node;

controlling, when an arbitrary one of the plurality of mobile terminals performs communication, the core network and the base station to use the shared CNB and the first RAB for the arbitrary one of the plurality of mobile terminals; and when a first mobile terminal and a second mobile terminal of the plurality of mobile terminals simultaneously perform communication, controlling the core network and the base station to use the shared CNB and the first RAB for the first mobile terminal and to additionally create and use a second CNB and a second RAB for the second mobile terminal.

(Supplementary Note B1)

A mobile communication system including:

a radio access network including a base station; and a core network including an external gateway and a transfer node, in which:

the core network creates first and second shared core network bearers, CNBs, between the transfer node and the external gateway, the first and second CNBs are shared for transferring user packets of a plurality of mobile terminals connected to the base station, the core network provides a one-to-one mapping between each of the first CNB and the second CNB and a radio access bearer, RAB, and when an arbitrary two of the plurality of mobile terminals perform communication, the core network uses the first shared CNB for one of the arbitrary two of the plurality of mobile terminals and also uses the second shared CNB for the other one of the arbitrary two of the plurality of mobile terminals.

(Supplementary Note B2)

The mobile communication system according to Supplementary note B1, in which, when a bearer recovery request regarding the first shared CNB is rejected by the core network, each mobile terminal of the plurality of mobile terminals sends a bearer recovery request regarding the second shared CNB.

(Supplementary Note B3)

The mobile communication system according to Supplementary note B1 or B2, in which the plurality of mobile terminals and the core network support a multiple protocol data network, PDN, function, and the first shared CNB and the second shared CNB are respectively associated with a first PDN connection and a second PDN connection.

(Supplementary Note B4)

The mobile communication system according to any one of Supplementary notes B1 to B3, in which endpoint configurations of the first RAB and the second RAB are commonly used for transferring user packets of the plurality of mobile terminals.

(Supplementary Note B5)

A control apparatus, arranged in a core network, including:

a controller that performs bearer control, in which:

the controller controls the core network to create first and second shared core network bearers, CNBs, between a transfer node and an external gateway, the first and second CNBs are shared for transferring user packets of a plurality of mobile terminals connected to a base station, the controller controls the core network to provide a one-to-one mapping between each of the first CNB and the second CNB and a radio access bearer, RAB, and when an arbitrary two of the plurality of mobile terminals perform communication, the controller controls the core network to use the first shared CNB for one of the arbitrary two of the plurality of mobile terminals and to also use the second shared CNB for the other one of the arbitrary two of the plurality of mobile terminals.

(Supplementary Note B6)

The control apparatus according to Supplementary note B5, in which endpoint configurations of the first RAB and the second RAB are commonly used for transferring user packets of the plurality of mobile terminals.

(Supplementary Note B7)

A mobile terminal that is used in combination with the control apparatus according to Supplementary note B5, and operates to send, in response to a rejection of a bearer recovery request regarding the first shared CNB by the core network, a bearer recovery request regarding the second shared CNB.

(Supplementary Note B8)

A communication control method comprising:

controlling a core network to create first and second shared core network bearers, CNBs, between a transfer node and an external gateway, the first and second CNBs being shared for transferring user packets of a plurality of mobile terminals connected to a base station;

controlling the core network to provide a one-to-one mapping between each of the first CNB and the second CNB and a radio access bearer, RAB; and when an arbitrary two of the plurality of mobile terminals perform communication, controlling the core network to use the first shared CNB for one of the arbitrary two of the plurality of mobile terminals and to also use the second shared CNB for the other one of the plurality of mobile terminals.

(Supplementary Note B9)

A program for causing a computer to execute a communication control method, the communication control method including:

controlling a core network to create first and second shared core network bearers, CNBs, between a transfer node and an external gateway, the first and second CNBs being shared for transferring user packets of a plurality of mobile terminals connected to a base station;

controlling the core network to provide a one-to-one mapping between each of the first CNB and the second CNB and a radio access bearer, RAB; and when an arbitrary two of the plurality of mobile terminals perform communication, controlling the core network to use the first shared CNB for one of the arbitrary two of the plurality of mobile terminals and to also use the second shared CNB for the other one of the plurality of mobile terminals.

(Supplementary Note C1)

A mobile communication system including:

a radio access network including a base station; and a core network including an external gateway and a transfer node, in which:

the core network creates a shared core network bearer, CNB, between the transfer node and the external gateway, the shared CNB is shared for transferring user packets of a plurality of mobile terminals connected to the base station, the core network provides a mapping between the shared CNB and a first radio access bearer, RAB, the core network uses the shared CNB and the first RAB for an arbitrary first mobile terminal of the plurality of mobile terminals when the first mobile terminal performs communication, and in response to receiving a communication request from an arbitrary second mobile terminal of the plurality of mobile terminals while the first mobile terminal performs communication, the core network creates a second RAB, provides a mapping between the second RAB and the shared CNB, and uses the shared CNB and the second RAB for the second mobile terminal.

(Supplementary Note C2)

The mobile communication system according to Supplementary note C1, in which the core network releases a configuration in the core network of the second RAB in response to a completion of communication of the second mobile terminal.

(Supplementary Note C3)

The mobile communication system according to Supplementary note C1 or C2, in which the transfer node refers to a destination address of each user packet received through the shared CNB, assigns a user packet destined for the first mobile terminal to the first RAB, and assigns a user packet destined for the second mobile terminal to the second RAB.

(Supplementary Note C4)

The mobile communication system according to any one of Supplementary notes C1 to C3, in which an endpoint configuration of the first RAB is commonly used for user packet transfer of the plurality of mobile terminals.

(Supplementary Note C5)

A control apparatus, arranged in a core network, including:

a controller that performs bearer control, in which the controller controls the core network to create a shared core network bearer, CNB, between a transfer node and an external gateway, the shared CNB is shared for transferring user packets of a plurality of mobile terminals connected to a base station, the controller controls the core network to provide a mapping between the shared CNB and a first radio access bearer, RAB, the controller controls the core network and the base station to use the shared CNB and the first RAB for an arbitrary first mobile terminal of the plurality of mobile terminals when the first mobile terminal performs communication, and in response to receiving a communication request from an arbitrary second mobile terminal of the plurality of mobile terminals while the first mobile terminal performs communication, the controller controls the core network and the base station to create a second RAB, to provide a mapping between the second RAB and the shared CNB, and to use the shared CNB and the second RAB for the second mobile terminal.

(Supplementary Note C6)

The control apparatus according to Supplementary note C5, in which the controller controls the core network to release a configuration in the core network of the second RAB in response to a completion of communication of the second mobile terminal.

(Supplementary Note C7)

The control apparatus according to Supplementary note C5 or C6, in which an endpoint configuration of the first RAB is commonly used for user packet transfer of the plurality of mobile terminals.

(Supplementary Note C8)

A communication control method including:

controlling a core network to create a shared core network bearer, CNB, between a transfer node and an external gateway, the shared CNB being shared for transferring user packets of a plurality of mobile terminals connected to a base station;

controlling the core network to provide a mapping between the shared CNB and a first radio access bearer, RAB;

controlling the core network and the base station to use the shared CNB and the first RAB for an arbitrary first mobile terminal of the plurality of mobile terminals when the first mobile terminal performs communication; and in response to receiving a communication request from an arbitrary second mobile terminal of the plurality of mobile terminals while the first mobile terminal performs communication, controlling the core network and the base station to create a second RAB, to provide a mapping between the second RAB and the shared CNB, and to use the shared CNB and the second RAB for the second mobile terminal.

(Supplementary Note C9)

A program for causing a computer to execute a communication control method, the communication control method including:

controlling a core network to create a shared core network bearer, CNB, between a transfer node and an external gateway, the shared CNB being shared for transferring user packets of a plurality of mobile terminals connected to a base station;

controlling the core network to provide a mapping between the shared CNB and a first radio access bearer, RAB;

controlling the core network and the base station to use the shared CNB and the first RAB for an arbitrary first mobile terminal of the plurality of mobile terminals when the first mobile terminal performs communication; and in response to receiving a communication request from an arbitrary second mobile terminal of the plurality of mobile terminals while the first mobile terminal performs communication, controlling the core network and the base station to create a second RAB, to provide a mapping between the second RAB and the shared CNB, and to use the shared CNB and the second RAB for the second mobile terminal.

(Supplementary Note D1)

A mobile communication system including:

a radio access network including a base station; and a core network including an external gateway and a transfer node, in which the core network creates a shared core network bearer, CNB, between the transfer node and the external gateway, the shared CNB is shared for transferring user packets of a plurality of mobile terminals connected to the base station, the core network provides a one-to-one mapping between the shared CNB and a first radio access bearer, RAB, in the transfer node, the core network uses the shared CNB and the first RAB for an arbitrary one of the plurality of mobile terminals when the arbitrary one of the plurality of mobile terminals performs communication, and when the arbitrary one of the plurality of mobile terminals ends communication and transitions from a CONNECTED state to an IDLE state, the core network sends a notification to temporarily suppress the next communication to the arbitrary one of the plurality of mobile terminals.

(Supplementary Note D2)

The mobile communication system according to Supplementary note D1, in which an endpoint configuration of the first RAB is commonly used for user packet transfer of the plurality of mobile terminals.

(Supplementary Note D3)

A control apparatus, arranged in a core network, including:

a controller that performs bearer control, in which:

the controller controls the core network to create a shared core network bearer, CNB, between a transfer node and an external gateway, the shared CNB is shared for transferring user packets of a plurality of mobile terminals connected to a base station, the controller controls the core network to provide a one-to-one mapping between the shared CNB and a first radio access bearer, RAB), in the transfer node, the controller controls the core network and the base station to use the shared CNB and the first RAB for an arbitrary one of the plurality of mobile terminals when the arbitrary one of the plurality of mobile terminals performs communication, and when the arbitrary one of the plurality of mobile terminals ends communication and transitions from a CONNECTED state to an IDLE state, the controller sends a notification to temporarily suppress the next communication to the arbitrary one of the plurality of mobile terminals.

(Supplementary Note D4)

A communication control method including:

controlling a core network to create a shared core network bearer, CNB between a transfer node and an external gateway, the shared CNB being shared for transferring user packets of a plurality of mobile terminals connected to a base station;

controlling the core network to provide a one-to-one mapping between the shared CNB and a first radio access bearer, RAB, in the transfer node;

controlling the core network and the base station to use the shared CNB and the first RAB for an arbitrary one of the plurality of mobile terminals when the arbitrary one of the plurality of mobile terminals performs communication; and when the arbitrary one of the plurality of mobile terminals ends communication and transitions from a CONNECTED state to an IDLE state, sending a notification to temporarily suppress the next communication to the arbitrary one of the plurality of mobile terminals.

(Supplementary Note D5)

A program for causing a computer to execute a communication control method, the communication control method including:

controlling a core network to create a shared core network bearer, CNB, between a transfer node and an external gateway, the shared CNB being shared for transferring user packets of a plurality of mobile terminals connected to a base station;

controlling the core network to provide a one-to-one mapping between the shared CNB and a first radio access bearer, RAB, in the transfer node;

controlling the core network and the base station to use the shared CNB and the first RAB for an arbitrary one of the plurality of mobile terminals when the arbitrary one of the plurality of mobile terminals performs communication; and when the arbitrary one of the plurality of mobile terminals ends communication and transitions from a CONNECTED state to an IDLE state, sending a notification to temporarily suppress the next communication to the arbitrary one of the plurality of mobile terminals.

(Supplementary Note E1)

A mobile communication system including:

a radio access network including a base station; and a core network including an external gateway and a transfer node, in which the core network determines, based on communication characteristics of a plurality of mobile terminals connected to the base station, at least one mobile terminal to be included in a terminal group, the core network creates a shared core network bearer, CNB, between the transfer node and the external gateway, the shared CNB is shared for transferring user packets of the terminal group, the core network provides a one-to-one mapping between the shared CNB and a first radio access bearer, RAB, in the transfer node, and the core network uses, when an arbitrary one of mobile terminals included in the terminal group performs communication, the shared CNB and the first RAB for the arbitrary one of the mobile terminals.

(Supplementary Note E2)

The mobile communication system according to Supplementary note E1, in which the number of mobile terminals that can simultaneously communicate using the shared CNB and the first RAB is restricted to one.

(Supplementary Note E3)

The mobile communication system according to Supplementary note E1 or E2, in which the core network adds, into the terminal group, a mobile terminal in which a frequency of communication is lower than a predetermined reference level.

(Supplementary Note E3)

The mobile communication system according to Supplementary note E1 or E2, in which the core network adds, into the terminal group, a first mobile terminal and a second mobile terminal having different tolerance levels for communication delay.

(Supplementary Note E4)

The mobile communication system according to Supplementary note E3, in which:

the first mobile terminal has a lower tolerance level for communication delay than that of the second mobile terminal, and in response to receiving a communication request from the first mobile terminal while the second mobile terminal is performing communication using the shared CNB and the first RAB, the core network ends the communication of the second mobile terminal and allocates the shared CNB and the first RAB to the first mobile terminal.

(Supplementary Note E5)

A control apparatus arranged in a core network, comprising:

a controller that performs bearer control, in which the controller determines, based on communication characteristics of a plurality of mobile terminals connected to a base station, at least one mobile terminal to be included in a terminal group, the controller controls the core network to create a shared core network bearer, CNB, between a transfer node and an external gateway, the shared CNB is shared for transferring user packets of the terminal group, the controller controls the core network to provide a one-to-one mapping between the shared CNB and a first radio access bearer, RAB, in the transfer node, when an arbitrary one of mobile terminals included in the terminal group performs communication, the controller controls the core network and the base station to use the shared CNB and the first RAB for the arbitrary one of the mobile terminals, and the controller determines, based on communication characteristics of the plurality of mobile terminals connected to the base station, at least one mobile terminal to be included in the terminal group.

(Supplementary Note E6)

The control apparatus according to Supplementary note E5, in which the number of mobile terminals that can simultaneously communicate using the shared CNB and the first RAB is restricted to one.

(Supplementary Note E7)

The control apparatus according to Supplementary note E5 or E6, in which the controller adds, into the terminal group, a mobile terminal in which a frequency of communication is lower than a predetermined reference level.

(Supplementary Note E8)

The control apparatus according to Supplementary note E5 or E6, in which the controller adds, into the terminal group, a first mobile terminal and a second mobile terminal having different tolerance levels for communication delay.

(Supplementary Note E9)

The control apparatus according to Supplementary note E8, in which:

the first mobile terminal has a lower tolerance level for communication delay than that of the second mobile terminal, and in response to receiving a communication request from the first mobile terminal while the second mobile terminal is performing communication using the shared CNB and the first RAB, the controller controls the core network and the base station to end the communication of the second mobile terminal and allocate the shared CNB and the first RAB to the first mobile terminal.

(Supplementary Note E10)

A communication control method including:

determining, based on communication characteristics of a plurality of mobile terminals connected to a base station, at least one mobile terminal to be included in a terminal group;

controlling the core network to create a shared core network bearer, CNB, between a transfer node and an external gateway, the shared CNB being shared for transferring user packets of the terminal group;

controlling the core network to provide a one-to-one mapping between the shared CNB and a first radio access bearer, RAB, in the transfer node; and when an arbitrary one of mobile terminals included in the terminal group performs communication, controlling the core network and the base station to use the shared CNB and the first RAB for the arbitrary one of the mobile terminals.

(Supplementary Note E11)

A program for causing a computer to execute a communication control method, the method including:

determining, based on communication characteristics of a plurality of mobile terminals connected to a base station, at least one mobile terminal to be included in a terminal group;

controlling the core network to create a shared core network bearer, CNB, between a transfer node and an external gateway, the shared CNB being shared for transferring user packets of the terminal group;

controlling the core network to provide a one-to-one mapping between the shared CNB and a first radio access bearer, RAB, in the transfer node; and when an arbitrary one of mobile terminals included in the terminal group performs communication, controlling the core network and the base station to use the shared CNB and the first RAB for the arbitrary one of the mobile terminals.

This application is based upon and claims the benefit of priority from Japanese Patent Application No. 2012-214050, filed on Sep. 27, 2012, the disclosure of which is incorporated herein in its entirety by reference.

REFERENCE SIGNS LIST

1 MOBILE TERMINAL (UE)
2 BASE STATION
3 MOBILITY MANAGEMENT NODE
4 TRANSFER NODE
5 EXTERNAL GATEWAY
6 SUBSCRIBER INFORMATION DATABASE
7 COMMUNICATION MANAGEMENT UNIT
9 EXTERNAL NETWORK
10 RADIO ACCESS NETWORK (RAN)
20 CORE NETWORK (CN)
30 SHARED CORE NETWORK BEARER (SHARED CNB)
31 CORE NETWORK BEARER (CNB)
32 SHARED CNB (SHARED CNB)
40-43 BEARERS
50-53 RADIO BEARERS
301 CONTROLLER

The invention claimed is:

1. A mobile communication system comprising:
a radio access network including a base station; and
a core network including an external gateway and a transfer node, wherein
the core network creates a shared core network bearer, CNB, between the transfer node and the external gateway, the shared CNB is shared for transferring user packets of a plurality of mobile terminals connected to the base station,
the core network provides a one-to-one mapping between the shared CNB and a first radio access bearer, RAB, in the transfer node,
the core network uses the shared CNB and the first RAB for an arbitrary one of the plurality of mobile terminals when the arbitrary one of the plurality of mobile terminals performs communication,
when a first mobile terminal and a second mobile terminal of the plurality of mobile terminals simultaneously perform communication, the core network uses the shared CNB and the first RAB for the first mobile terminal and additionally creates and uses a second CNB and a second RAB for the second mobile terminal, and
in response to receiving a bearer recovery request from the second mobile terminal while the first mobile terminal is already performing communication, the core network rejects the bearer recovery request, requests the second mobile terminal to detach, and creates the second CNB and the second RAB in response to a bearer establishment request transmitted from the second mobile terminal after the second mobile terminal has detached.

2. The mobile communication system according to claim 1, wherein, in response to a completion of communication of the second mobile terminal, the core network releases configurations in the core network of the second RAB and the second CNB.

3. The mobile communication system according to claim 1, wherein
the external gateway sets a packet filter to map user packets, destined for an address within an IP address range allocated to the plurality of mobile terminals, to the shared CNB, and
the external gateway modifies the packet filter to map user packets, destined for an address allocated to the second mobile terminal, to the second CNB when the first mobile terminal and the second mobile terminal simultaneously perform communication.

4. The mobile communication system according to claim 1, wherein the core network creates the second CNB and the second RAB in response to receiving a bearer recovery request from the second mobile terminal while the first mobile terminal is already performing communication.

5. The mobile communication system according to claim 1, wherein an endpoint configuration of the first RAB is commonly used for transferring user packets of the plurality of mobile terminals.

6. A control apparatus, arranged in a core network, comprising:
a controller configured to perform bearer control, wherein:
the controller controls the core network to create a shared core network bearer, CNB, between a transfer node and an external gateway, the shared CNB is shared for transferring user packets of a plurality of mobile terminals connected to a base station,
the controller controls the core network to provide a one-to-one mapping between the shared CNB and a first radio access bearer, RAB, in the transfer node,
the controller controls the core network and the base station to use the shared CNB and the first RAB for an arbitrary one of the plurality of mobile terminals when the arbitrary one of the plurality of mobile terminals performs communication,
when a first mobile terminal and a second mobile terminal of the plurality of mobile terminals simultaneously perform communication, the controller controls the core network and the base station to use the shared CNB and the first RAB for the first mobile terminal and to additionally create and use a second CNB and a second RAB for the second mobile terminal, and in response to receiving a bearer recovery request from the second mobile terminal while the first mobile terminal is already performing communication, the controller rejects the bearer recovery request, requests the second mobile terminal to detach, and creates the second CNB and the second RAB in response to a bearer establishment request transmitted from the second mobile terminal after the second mobile terminal has detached.

7. The control apparatus according to claim 6, wherein, in response to a completion of communication of the second mobile terminal, the controller controls the core network to release configurations in the core network of the second RAB and the second CNB.

8. The control apparatus according to claim 6, wherein:
the controller performs control to set, in the external gateway, a packet filter to map user packets, destined for an address within an IP address range allocated to the plurality of mobile terminals, to the shared CNB, and
the controller performs control to modify the packet filter to map user packets, destined for an address allocated to the second mobile terminal, to the second CNB when the first mobile terminal and the second mobile terminal simultaneously perform communication.

9. The control apparatus according to claim 6, wherein the controller creates the second CNB and the second RAB in response to receiving a bearer recovery request from the second mobile terminal while the first mobile terminal is already performing communication.

10. The control apparatus according to claim 6, wherein an endpoint configuration of the first RAB is commonly used for transferring user packets of the plurality of mobile terminals.

11. A communication control method comprising:
controlling a core network to create a shared core network bearer, CNB, between a transfer node and an external gateway, the shared CNB being shared for transferring user packets of a plurality of mobile terminals connected to a base station;
controlling the core network to provide a one-to-one mapping between the shared CNB and a first radio access bearer, RAB, in the transfer node;
controlling, when an arbitrary one of the plurality of mobile terminals performs communication, the core network and the base station to use the shared CNB and the first RAB for the arbitrary one of the plurality of mobile terminals;
when a first mobile terminal and a second mobile terminal of the plurality of mobile terminals simultaneously perform communication, controlling the core network and the base station to use the shared CNB and the first RAB for the first mobile terminal and to additionally create and use a second CNB and a second RAB for the second mobile terminal; and
in response to receiving a bearer recovery request from the second mobile terminal while the first mobile terminal is already performing communication, rejecting the bearer recovery request, requesting the second mobile terminal to detach, and creating the second CNB and the second RAB in response to a bearer establishment request transmitted from the second mobile terminal after the second mobile terminal has detached.

12. A non-transitory computer readable medium storing a program for causing a computer to execute a communication control method, wherein the communication control method comprises:
controlling a core network to create a shared core network bearer, CNB, between a transfer node and an external gateway, the shared CNB being shared for transferring user packets of a plurality of mobile terminals connected to a base station;
controlling the core network to provide a one-to-one mapping between the shared CNB and a first radio access bearer, RAB, in the transfer node;
controlling, when an arbitrary one of the plurality of mobile terminals performs communication, the core network and the base station to use the shared CNB and the first RAB for the arbitrary one of the plurality of mobile terminals;
when a first mobile terminal and a second mobile terminal of the plurality of mobile terminals simultaneously perform communication, controlling the core network and the base station to use the shared CNB and the first RAB for the first mobile terminal and to additionally create and use a second CNB and a second RAB for the second mobile terminal; and
in response to receiving a bearer recovery request from the second mobile terminal while the first mobile terminal is already performing communication, resetting the bearer recovery request, requesting the second mobile terminal to detach, and creating the second CNB and the second RAB in response to a bearer establishment request transmitted from the second mobile terminal after the second mobile terminal has detached.

* * * * *